United States Patent
Xu et al.

(10) Patent No.: US 11,870,537 B2
(45) Date of Patent: Jan. 9, 2024

(54) USER EQUIPMENT CAPABILITY FOR SWITCHING POLARIZATIONS

(71) Applicant: QUALCOMM Incorporated, San Diego, CA (US)

(72) Inventors: Huilin Xu, Temecula, CA (US); Liangping Ma, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/450,782

(22) Filed: Oct. 13, 2021

(65) Prior Publication Data

US 2023/0112997 A1    Apr. 13, 2023

(51) Int. Cl.
*H04B 7/10*    (2017.01)
*H04W 72/10*   (2009.01)
*H04L 5/00*    (2006.01)
*H04W 72/23*   (2023.01)

(52) U.S. Cl.
CPC ............. *H04B 7/10* (2013.01); *H04L 5/0048* (2013.01); *H04W 72/23* (2023.01)

(58) Field of Classification Search
CPC ....... H04B 7/10; H04L 5/0048; H04W 72/042
See application file for complete search history.

(56) References Cited

U.S. PATENT DOCUMENTS

| | | | | |
|---|---|---|---|---|
| 2007/0296634 | A1* | 12/2007 | Popugaev | H01Q 5/378 |
| 2010/0079252 | A1* | 4/2010 | Tsujimoto | G06K 7/0008 |
| 2010/0277395 | A1* | 11/2010 | Satoh | H01Q 21/24 |
| 2011/0249657 | A1* | 10/2011 | Kishiyama | H04W 48/16 |
| 2012/0064825 | A1* | 3/2012 | Landon | H04B 7/10 |
| 2013/0023276 | A1* | 1/2013 | Du | H04W 72/1226 |
| 2016/0079682 | A1* | 3/2016 | Chang | H01Q 3/24 |
| 2021/0321276 | A1* | 10/2021 | Kim | H04W 76/27 |
| 2022/0039115 | A1* | 2/2022 | Sun | H04W 8/24 |
| 2022/0232503 | A1* | 7/2022 | Cheng | H04W 56/0045 |

FOREIGN PATENT DOCUMENTS

| | | |
|---|---|---|
| WO | 2021098058 A1 | 5/2021 |
| WO | WO-2021192302 A1 | 9/2021 |

OTHER PUBLICATIONS

Partial International Search Report—PCT/US2022/076466—ISA/EPO—dated Jan. 16, 2023.

(Continued)

*Primary Examiner* — Ronald B Abelson
(74) *Attorney, Agent, or Firm* — Harrity & Harrity, LLP/QUALCOMM Incorporated

(57) ABSTRACT

Various aspects of the present disclosure generally relate to wireless communication. In some aspects, a user equipment (UE) may generate an indication of a UE capability for switching polarizations of one or more antennas of the UE. The UE may transmit the indication. The UE may also use a default polarization. Numerous other aspects are described.

45 Claims, 23 Drawing Sheets

(56) References Cited

OTHER PUBLICATIONS

Samsung: "Summary of Email Discussion for Rel.17 Enhancements on MIMO for NR", 3GPP TSG RAN Meeting #86, RP-192435, 3rd Generation Partnership Project (3GPP), Mobile Competence Centre, 650, Route Des Lucioles, F-06921, Sophia-Antipolis Cedex, France, vol. TSG RAN, No. Sitges, Spain, Dec. 9, 2019-Dec. 12, 2019, Dec. 3, 2019, XP051835464, 31 Pages, p. 2, Para 1, p. 5, Para 3, Fig 3-4, p. 9, Para 2, p. 18, Para 2, p. 32, Para 2.
International Search Report and Written Opinion—PCT/US2022/076466—ISA/EPO—dated Mar. 17, 2023.
Moderator (OPPO): "Summary #3 of 8.4.4 Other Aspects of NR-NTN", 3GPP TSG RAN WG1 Meeting #105e, R1-2106263, 3rd Generation Partnership Project, Mobile Competence Centre, 650, Route Des Lucioles, F-06921 Sophia-Antipolis Cedex, France, vol. RAN WG1, No. e-Meeting, May 10,2021-May 27, 2021, May 27, 2021, XP052015776, 70 pages, Section 3.1, Section 3.2.
ZTE: "Discussion on Additional Enhancement for NR-NTN", 3GPP TSG RAN WG1 #104e, R1-2100247, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, XP051970310, 6 Pages.

\* cited by examiner

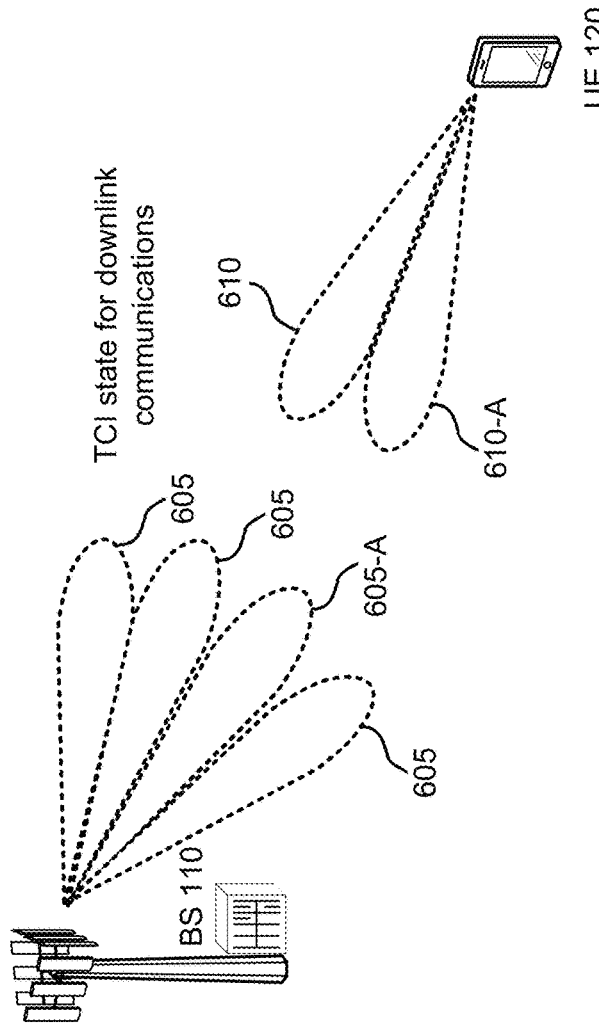
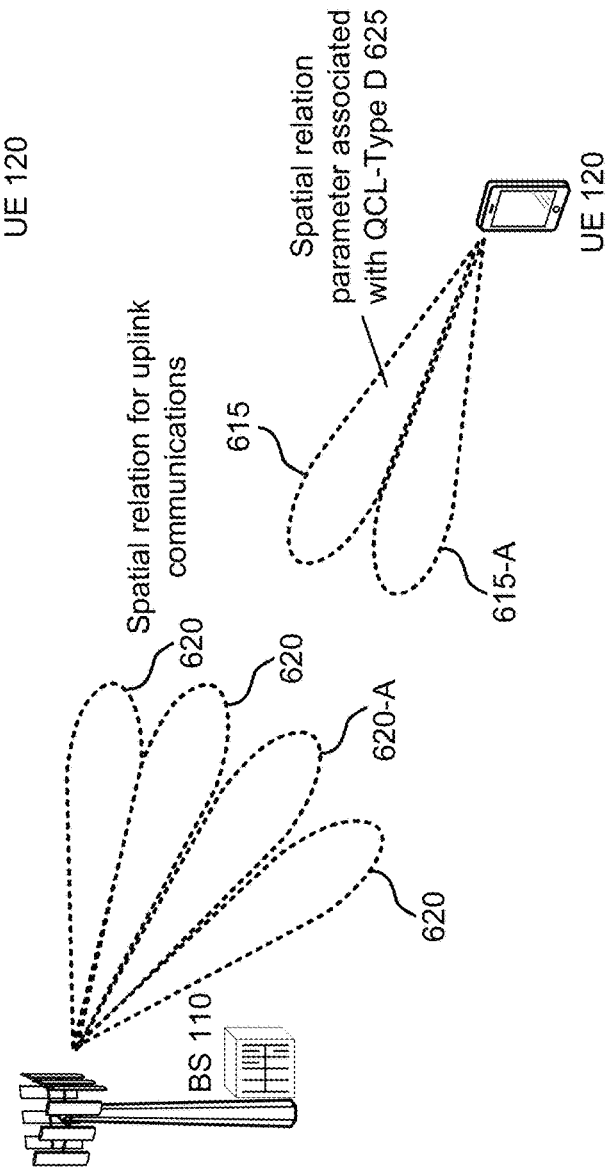
FIG. 6A
FIG. 6B

USER EQUIPMENT CAPABILITY FOR SWITCHING POLARIZATIONS

INTRODUCTION

Aspects of the present disclosure generally relate to wireless communication and to techniques and apparatuses for switching polarizations.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include generating an indication of a UE capability for switching polarizations (e.g., linear, circular) of one or more antennas of the UE. The method may include transmitting the indication.

Some aspects described herein relate to a method of wireless communication performed by a base station. The method may include receiving, from a UE, an indication of a UE capability for switching polarizations of one or more antennas of the UE. The method may include transmitting, in downlink control information (DCI) to the UE, scheduling information that is based at least in part on the UE capability.

Some aspects described herein relate to a method of wireless communication performed by a UE. The method may include switching polarizations of one or more antennas of the UE based at least in part on a UE capability of the UE for switching polarizations. The method may include transmitting or receiving a communication.

Some aspects described herein relate to a UE for wireless communication. The UE may include a memory and one or more processors coupled to the memory. The one or more processors may be configured to generate an indication of a UE capability for switching polarizations of one or more antennas of the UE. The one or more processors may be configured to transmit the indication.

Some aspects described herein relate to a base station for wireless communication. The base station may include a memory and one or more processors coupled to the memory. The one or more processors may be configured to receive, from a UE, an indication of a UE capability for switching polarizations of one or more antennas of the UE. The one or more processors may be configured to transmit, in DCI to the UE, scheduling information that is based at least in part on the UE capability.

Some aspects described herein relate to a UE for wireless communication. The UE may include a memory and one or more processors coupled to the memory. The one or more processors may be configured to switch polarizations of one or more antennas of the UE based at least in part on a UE capability of the UE for switching polarizations. The one or more processors may be configured to transmit or receive a communication.

Some aspects described herein relate to a non-transitory computer-readable medium that stores a set of instructions for wireless communication by a UE. The set of instructions, when executed by one or more processors of the UE, may cause the UE to generate an indication of a UE capability for switching polarizations of one or more antennas of the UE. The set of instructions, when executed by one or more processors of the UE, may cause the UE to transmit the indication.

Some aspects described herein relate to a non-transitory computer-readable medium that stores a set of instructions for wireless communication by a base station. The set of instructions, when executed by one or more processors of the base station, may cause the base station to receive, from a UE, an indication of a UE capability for switching polarizations of one or more antennas of the UE. The set of instructions, when executed by one or more processors of the base station, may cause the base station to transmit, in DCI to the UE, scheduling information that is based at least in part on the UE capability.

Some aspects described herein relate to a non-transitory computer-readable medium that stores a set of instructions for wireless communication by a UE. The set of instructions, when executed by one or more processors of the UE, may cause the UE to switch polarizations of one or more antennas of the UE based at least in part on a UE capability of the UE for switching polarizations. The set of instructions, when executed by one or more processors of the UE, may cause the UE to transmit or receive a communication.

Some aspects described herein relate to an apparatus for wireless communication. The apparatus may include means for generating an indication of a UE capability for switching polarizations of one or more antennas of the apparatus. The apparatus may include means for transmitting the indication.

Some aspects described herein relate to an apparatus for wireless communication. The apparatus may include means for receiving, from a UE, an indication of a UE capability for switching polarizations of one or more antennas of the UE. The apparatus may include means for transmitting, in DCI to the UE, scheduling information that is based at least in part on the UE capability.

Some aspects described herein relate to an apparatus for wireless communication. The apparatus may include means for switching polarizations of one or more antennas of the apparatus based at least in part on a UE capability of the apparatus for switching polarizations. The apparatus may include means for transmitting or receiving a communication.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6A and FIG. 6B are diagrams illustrating examples of using beams for communications between a base station and a UE, in accordance with the present disclosure.

DETAILED DESCRIPTION

Figure 1:
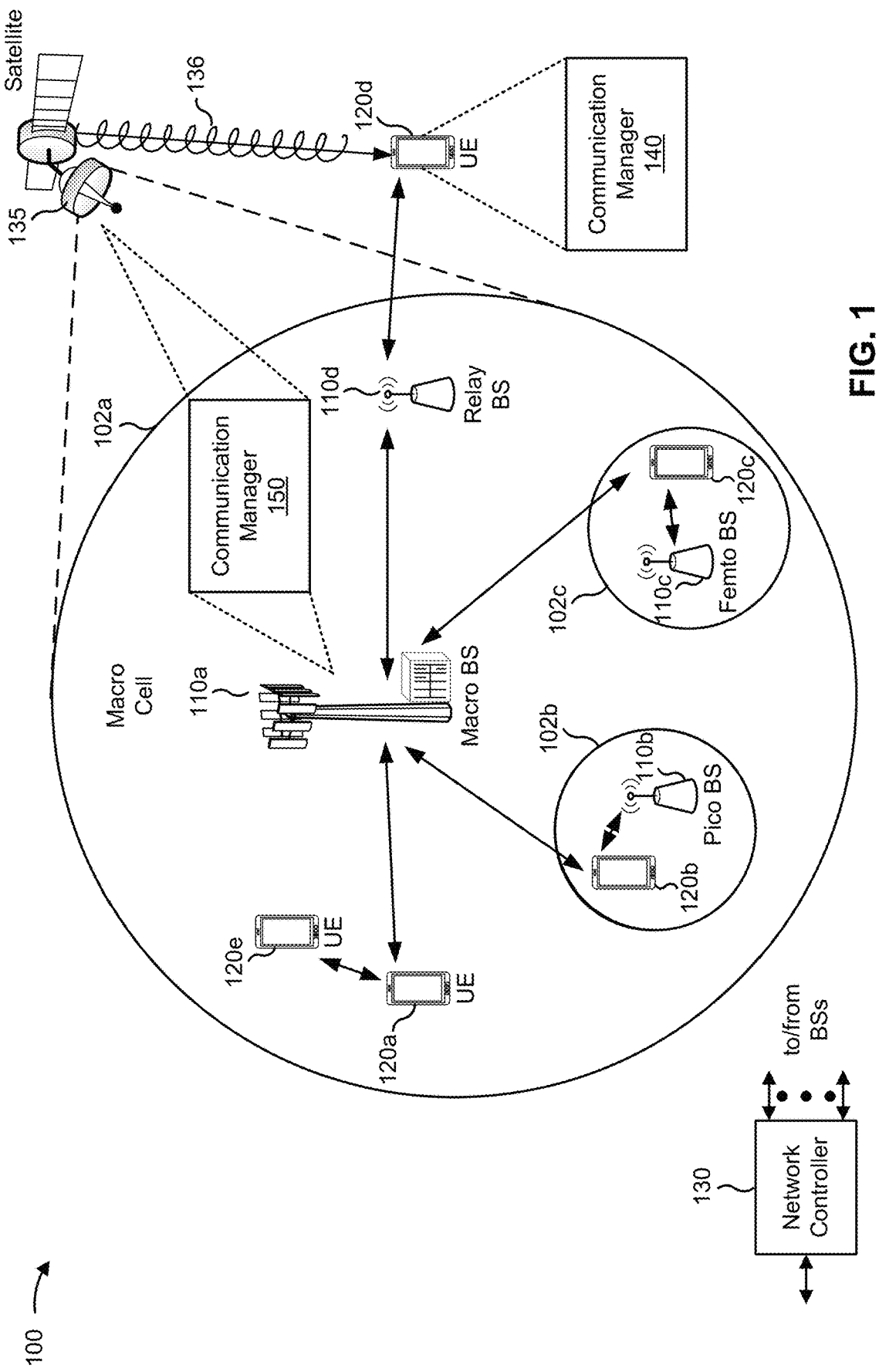
FIG. 1 is a diagram illustrating an example of a wireless network, in accordance with the present disclosure.

A wireless communication device may transmit and receive with beams that have a polarization. A polarization describes the way an electric field of an electromagnetic wave is oriented. Linear polarization occurs when the tip of the electric field of an electromagnetic wave at a fixed point in space oscillates along a straight line over time. Circular polarization occurs when the tip of the electric field of an electromagnetic wave at a fixed point in space traces a circle, and the electromagnetic wave may be formed by superposing two orthogonal linearly polarized waves of equal amplitude and a 90-degree phase difference. Portable devices, such as user equipments (UEs), may have varying polarizations due to movement or location. For example, a transmitting UE may move to a location in which a transmitted signal is reflected off of a surface (e.g., wall) to a receiving UE. The receiving UE may expect a receive polarization.

However, the receive polarization may be different than expected due to the signal reflection off of the wall. The signal reflection may reverse or flip the polarization of the transmitted signal. If a polarization is different than expected, there may be a polarization mismatch and a loss of signal power.

A base station may indicate a polarization to a UE. In some aspects, the polarization indication may indicate a polarization relationship between a source transmission and a target transmission with respect to the base station and the UE. The polarization indication may indicate a polarization associated with a downlink transmission or an uplink transmission. Even when the UE has a capability to detect the polarization, the polarization indication may reduce an amount of processing that occurs at the UE.

In some aspects, a configuration for the downlink transmission may indicate a polarization relationship between the downlink transmission and a reference signal, such as a channel state information reference signal (CSI-RS) or a synchronization signal block (SSB). The UE may derive the polarization of the downlink transmission based at least in part on the polarization relationship indicated in the downlink configuration. The polarization relationship may be a parameter included in a transmission configuration indicator (TCI) state, which may be part of the downlink configuration transmitted from the base station to the UE. A TCI state may indicate a directionality or a characteristic of the downlink beam, such as one or more quasi-co-location (QCL) properties of the downlink beam.

A base station may, similar to current TCI state indications, dynamically indicate a polarization TCI state and use downlink control information (DCI) scheduling to switch the polarization TCI state for a physical downlink shared channel (PDSCH) communication or for an aperiodic CSI-RS. In one or more examples, changing a TCI state associated with QCL-Type A, B, or C may only involve the UE's baseband processing, while changing a TCI state associated with QCL-Type D may involve the UE programming its analog modules, which takes longer. For QCL-Type D, this delay is also called the beam switching time. A minimum beam switching time for the new QCL-Type D to take effect may be reported by the UE as a UE capability. The UE capability may correspond to how quickly the UE is able to reconfigure one or more antennas for a different beam. For QCL-Type D, UE capabilities may be defined separately for PDSCH and aperiodic CSI-RS.

The UE may also be limited as to how quickly the UE may switch polarizations. For example, switching from a first polarization to a second polarization involves adjusting one or more antennas of an antenna panel of the UE. Depending on the design or complexity of the UE, adjusting the antenna panel to handle a different polarization may take longer for the UE than the adjusting does for other UEs. If the UE is not able to switch polarizations during an expected time for switching, the UE may not be oriented in the proper polarization when a communication is expected to be transmitted or received. As a result, there may be a loss of signal power of the received signal. This may degrade the signal and waste processing resources and signaling resources with retransmissions.

According to various aspects described herein, the UE may indicate a UE capability for switching polarizations. This may include switching to a circular polarization from a linear polarization, switching from a circular polarization to a linear polarization, switching from a first circular polarization to a second circular polarization, or switching from a first linear polarization to a second linear polarization. The UE capability may correspond to how long the UE takes to switch to a new polarization after receiving an indication of a polarization switch on a physical downlink control channel (PDCCH). This may be referred to as a minimum polarization switching time. For example, a UE capability for switching polarizations may include the minimum quantity of OFDM symbols required by the UE to apply polarization information after receiving the information in DCI for PDSCH processing. The UE capability may include the minimum quantity of OFDM symbols required by the UE to apply polarization information after receiving the information in DCI for a triggered aperiodic CSI-RS. In some aspects, the UE may reuse the corresponding minimum supported beam switching time for QCL-Type D or use a default polarization when the polarization cannot be explicitly determined from the DCI. The default polarization may be a specified polarization that the UE uses by default. The UE, by indicating a UE capability for switching polarizations (e.g., circular polarizations), may ensure that the base station will provide the UE sufficient time to switch polarizations. Alternatively, the UE may default to a particular polarization if there is not sufficient time. As a result, the UE and the base station may avoid losses in signal strength that occur when the UE receives a signal with a polarization that is different than a polarization for which antennas of the UE are configured. Receiving a signal with a greater strength improves communications and conserves processing resources and signaling resources that would otherwise be consumed with retransmissions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some aspects, as shown, a cell may be provided by a base station 110 of a non-terrestrial network (NTN). As used herein, "non-terrestrial network" may refer to a network for which access is provided by a non-terrestrial base station, such as a base station carried by a satellite, a balloon, a dirigible, an airplane, an unmanned aerial vehicle, and/or a high altitude platform station. A base station in an NTN (NTN entity) may use a circular polarization. For example, a base station in a satellite 135 (NTN entity) may transmit a communication to the UE 120 using a circular polarization 136.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In one or more examples, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

The electromagnetic spectrum is often subdivided, by frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may generate an indication of a UE capability for switching polarizations of one or more antennas of the UE. The communication manager 140 may transmit the indication.

In some aspects, the communication manager 140 may switch polarizations of one or more antennas of the UE based at least in part on a UE capability of the UE for switching polarizations. The communication manager 140 may transmit or receive a communication. Additionally, or alternatively, the communication manager 140 may perform one or more other operations described herein.

In some aspects, the base station 110 or the satellite 135 (acting as a base station) may include a communication manager 150. As described in more detail elsewhere herein, the communication manager 150 may receive, from a UE, an indication of a UE capability for switching polarizations of one or more antennas of the UE. The communication manager 150 may transmit, in DCI to the UE, scheduling information that is based at least in part on the UE capability. Additionally, or alternatively, the communication manager 150 may perform one or more other operations described herein.

As indicated above, FIG. 1 is provided as an example. Other examples may differ from what is described with regard to FIG. 1.

Figure 2:
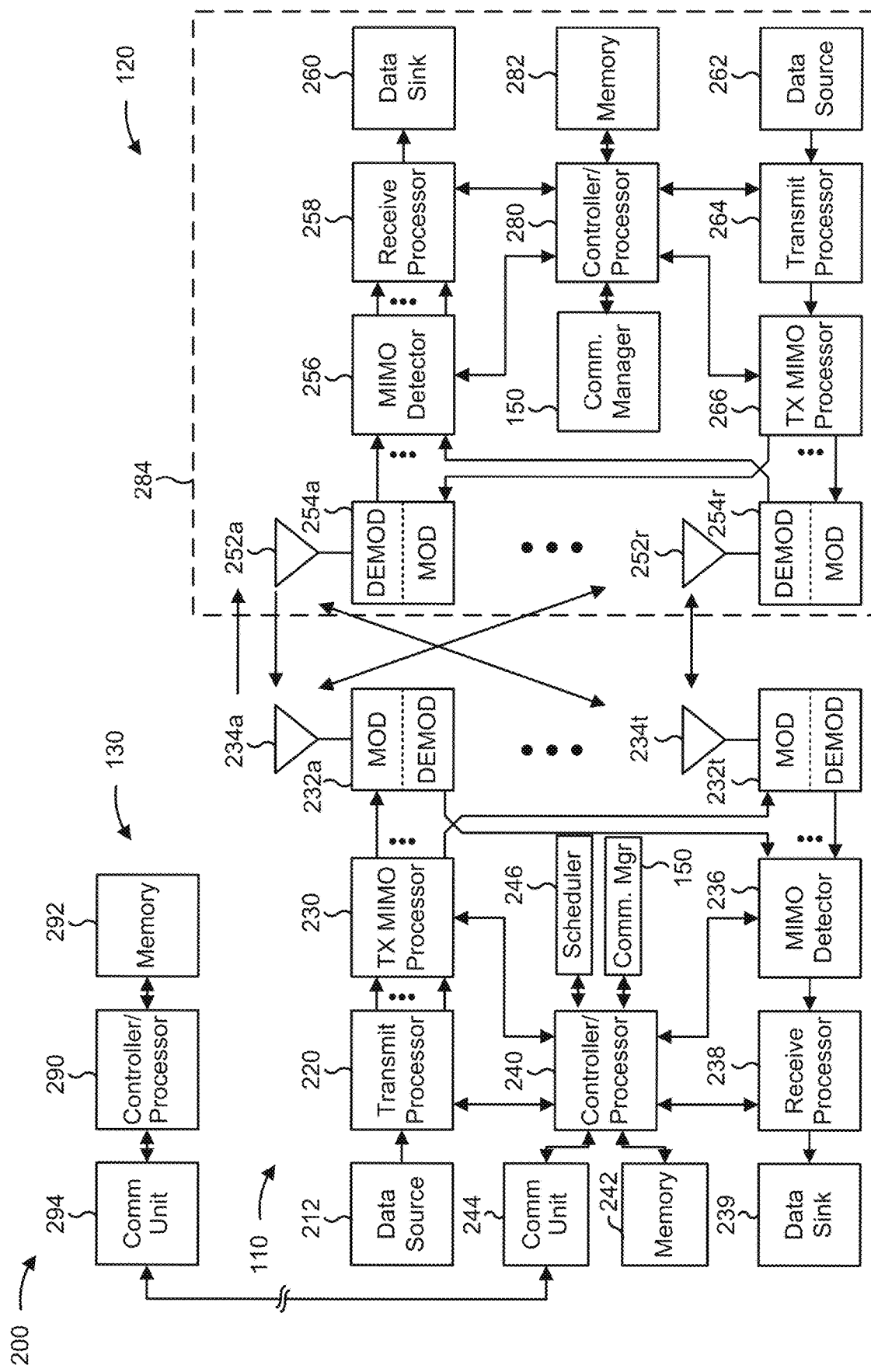
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

The base station 110 may be an NTN entity located in a terrestrial location or in a non-terrestrial location (e.g., satellite 135).

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with indicating a UE capability for switching polarizations, as described in more detail elsewhere herein. For example, a controller/processor of an NTN entity (e.g., controller/processor 240 of base station 110), controller/processor 280 of UE 120, and/or any other component(s) of FIG. 2 may perform or direct operations of, for example, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, an NTN entity, and/or the UE 120, may cause the one or more processors, the UE 120, and/or the base station 110 to perform or direct operations of, for example, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for generating an indication of a UE capability for switching polarizations of one or more antennas of the UE; and/or means for transmitting the indication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for receiving, from a UE, an indication of a UE capability for switching polarizations of one or more antennas of the UE;

and/or means for transmitting, in DCI to the UE, scheduling information that is based at least in part on the UE capability. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for switching polarizations of one or more antennas of the UE based at least in part on a UE capability of the UE for switching polarizations; and/or means for transmitting or receiving a communication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
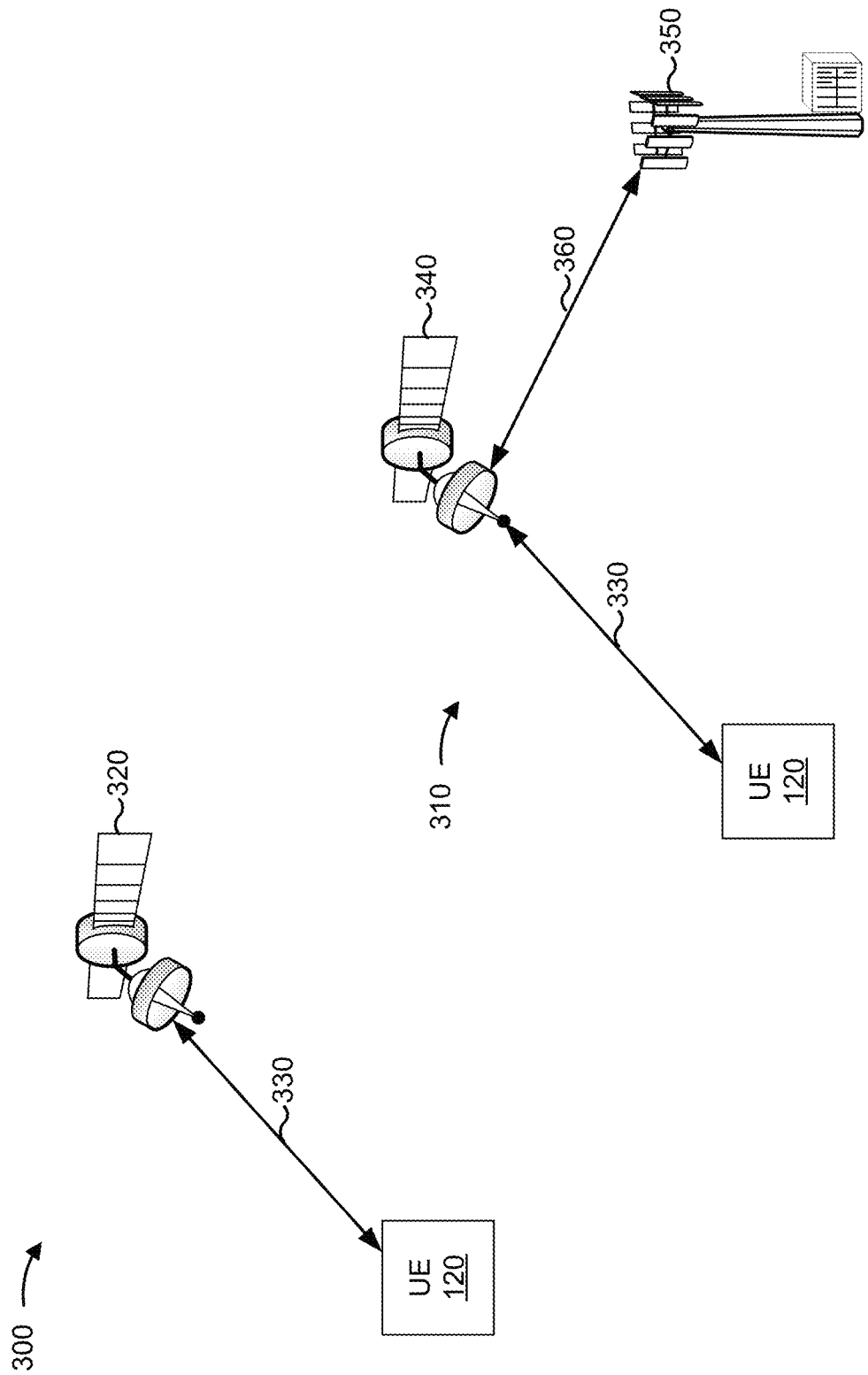
FIG. 3 is a diagram illustrating an example of a regenerative satellite deployment and an example of a transparent satellite deployment in a non-terrestrial network (NTN), in accordance with the present disclosure.

FIG. 3 is a diagram illustrating an example 300 of a regenerative satellite deployment and an example 310 of a transparent satellite deployment in an NTN, in accordance with the present disclosure.

Example 300 shows a regenerative satellite deployment. In example 300, a UE 120 is served by a satellite 320 (e.g., satellite 135) via a service link 330. For example, the satellite 320 may include a BS 110 (e.g., BS 110a), and/or a gNB. In some aspects, the satellite 320 may be referred to as a non-terrestrial base station, a regenerative repeater, an on-board processing repeater, and/or an NTN entity. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may also be considered to be an NTN entity. The satellite 340 may be a transparent satellite. The satellite 340 may relay a signal received from gateway 350 via a feeder link 360. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 330 to a frequency of the uplink radio frequency transmission on the feeder link 360, and may amplify and/or filter the uplink radio frequency transmission. In some aspects, the UEs 120 shown in example 300 and example 310 may be associated with a Global Navigation Satellite System (GNSS) capability, a Global Positioning System (GPS) capability, and/or the like, though not all UEs have such capabilities. The satellite 340 may provide a cell that covers the UE 120.

The service link 330 may include a link between the satellite 340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As indicated above, FIG. 3 is provided as an example. Other examples may differ from what is described with regard to FIG. 3.

Figure 4:
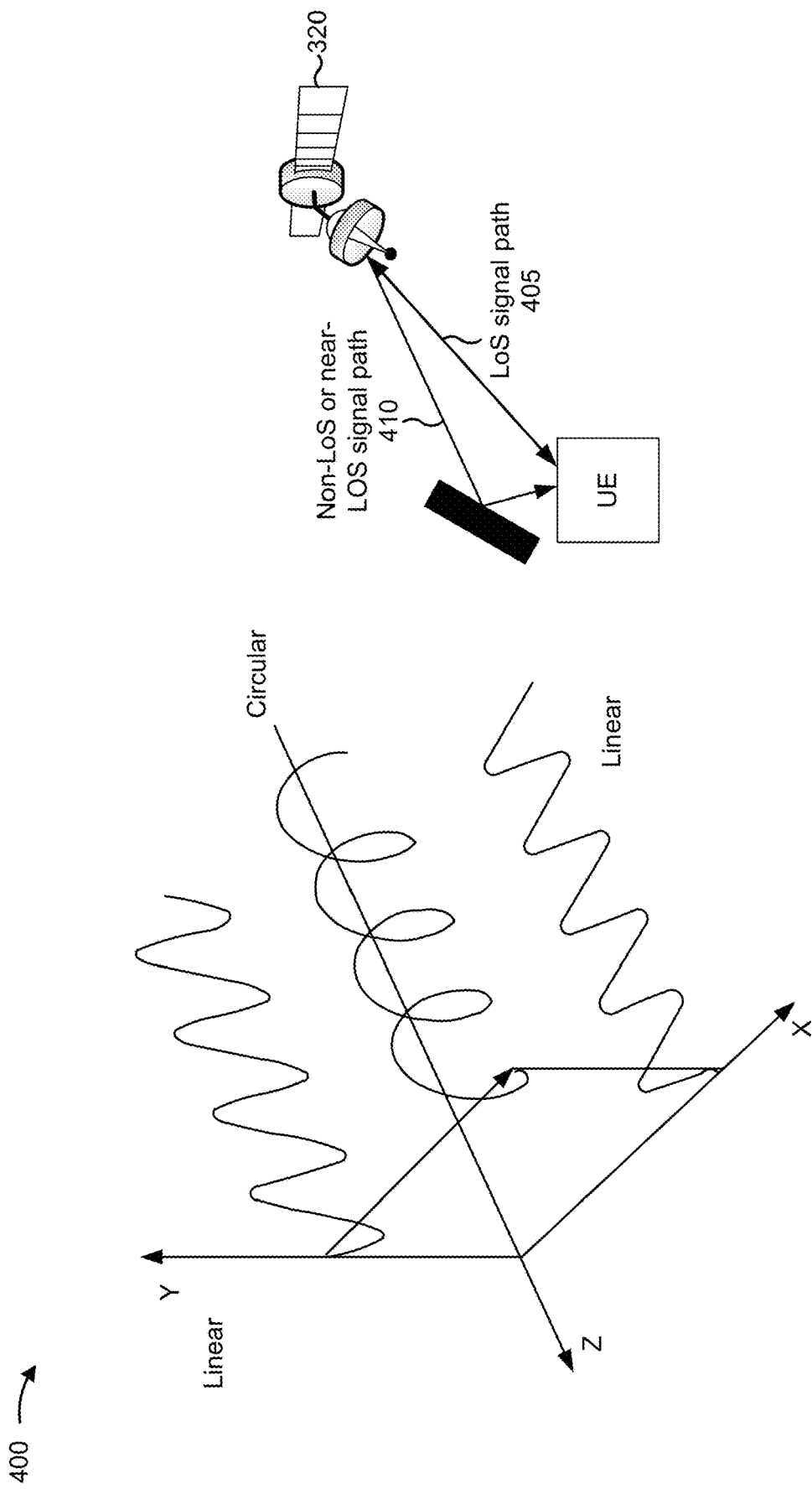
FIG. 4 is a diagram illustrating an example of linear polarization and circular polarization, in accordance with the present disclosure.

FIG. 4 is a diagram illustrating an example 400 of linear polarization and circular polarization, in accordance with the present disclosure.

An NTN entity may transmit and receive with beams that have a polarization. Linear polarization occurs when the tip of the electric field of an electromagnetic wave at a fixed point in space oscillates along a straight line over time. Circular polarization occurs when the tip of the electric field of an electromagnetic wave at a fixed point in space traces a circle, and the electromagnetic wave may be formed by superposing two orthogonal linearly polarized waves of equal amplitude and a 90-degree phase difference. A circular polarization may be a right-hand circular polarization (RHCP) or a left-hand circular polarization (LHCP).

"Transmit polarization" may refer to a polarization associated with a transmission from an NTN entity or a UE, and "receive polarization" may refer to a polarization associated with a reception at the NTN entity or the UE. In one or more examples, the transmit polarization may be the same as the receive polarization for the same communication link. However, in one or more other examples, the transmit polarization may be different than the receive polarization, which may result in a polarization mismatch loss. For example, when the transmit polarization is RHCP and the receive polarization is LHCP, the polarization mismatch loss may be greater than 20 decibels (dB). When the transmit polarization is a circular polarization and the receive polarization is a linear polarization, or vice versa, the polarization mismatch loss may be about 3 dB. When the transmit polarization is a horizontal linear polarization and the receive polarization is a vertical linear polarization, the polarization mismatch loss may be greater than 20 dB.

Portable devices, such as UEs, may have varying polarization due to movement. Further, linear polarization (e.g., horizontal linear polarization or vertical linear polarization) may be less reliable than circular polarization for portable devices with respect to frequency reuse. Frequency reuse may occur when a specified range of frequencies are used more than once in a same radio system, so that a total capacity of the radio system is increased without increasing an allocated bandwidth of the radio system.

A UE having a polarization capability may be able to detect a polarization and/or transmit signals with the polarization. For example, a UE having a capability to use two circular polarization modes may be able to detect a circular polarization associated with one of the two circular polarization modes. A UE with two linearly cross-polarized antennas may detect and transmit signals using both circular polarizations.

Polarization detection may increase processing at the UE and thus a polarization may be signaled to the UE. A base station, such as a base station located at satellite 320, may indicate a polarization to the UE. In some aspects, the polarization indication may indicate a polarization relationship between a source transmission and a target transmission with respect to the base station and the UE. The polarization indication may indicate a polarization associated with a downlink transmission or an uplink transmission. Even when the UE has a capability to detect the polarization, the polarization indication may reduce an amount of processing that occurs at the UE.

A signaled polarization may be accurate for direct line of sight (LOS) communications, such as for downlink or uplink transmission on signal path 405. However, a non-LOS communication may be a reflected communication (e.g., signal path 410), and a reflected communication may have a different polarization than a direct LOS communication. For example, an RHCP polarization of a downlink communication may become an LHCP polarization after being reflected off of a surface. That is, a best receive polarization for a downlink communication may be different than a polarization at the point of transmission. As for uplink communications, a UE may determine a best transmit polarization to correspond to a best receive polarization assuming downlink and uplink reciprocity (e.g., the uplink and the downlink are relatively close in frequency). However, the receive polarization may be different due to signal reflection. If a polarization is different than expected, there may be a polarization mismatch loss.

In some aspects, for LoS signal propagation, the polarization indication may avoid the polarization detection at the UE. In some aspects, for non-LoS and near-LoS signal propagation, the polarization indication may also be useful to the UE. For example, the polarization indication may enable the UE to determine a polarization of a first beam and a polarization of a second beam, and whether the polarization is the same or different with respect to the first beam and the second beam. For a downlink, a receive polarization may be different from a transmit polarization. For an uplink, a transmit polarization may correspond to a receive polarization, assuming downlink and uplink reciprocity (e.g., the uplink and the downlink are relatively close in frequency). For both the downlink and the uplink, the polarization indication may enable the UE to determine the transmit polarization and the receive polarization.

As indicated above, FIG. 4 is provided as an example. Other examples may differ from what is described with regard to FIG. 4.

Figure 5:
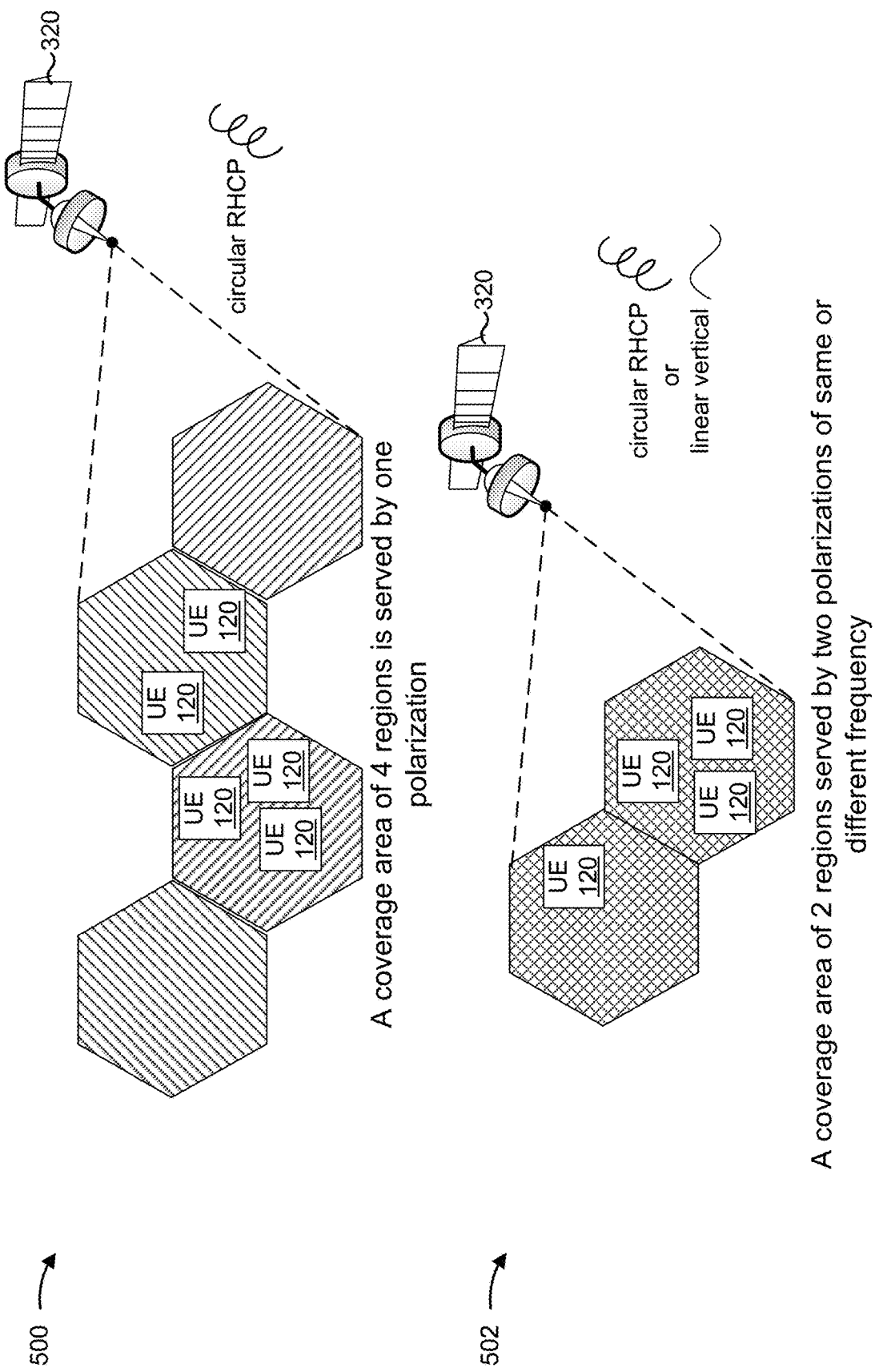
FIG. 5 is a diagram illustrating examples of coverage areas served by one or more polarizations, in accordance with the present disclosure.

FIG. 5 is a diagram illustrating examples 500 and 502 of coverage areas served by one or more polarizations, in accordance with the present disclosure.

FIG. 5 shows coverage areas or cells provided by an NTN entity, such as a non-terrestrial base station or a non-terrestrial relay station. The NTN entity may generate multiple beams associated with respective frequency regions. In some aspects, a beam may be an analog beam (e.g., generated by a cone antenna or a different type of antenna). In some aspects, the beam may be a digital beam, which may be formed by signal manipulation across an antenna array.

As shown by reference number 500, a coverage area (e.g., of 4 regions) may be served by one polarization to increase a system capacity. One polarization for the coverage area served by satellite 320 may be beneficial (e.g., higher received signal power) when the coverage area is associated with a sparse constellation of UEs (e.g., UE 120s), where the UEs are able to dynamically adjust a polarization. The polarization may be a circular polarization, such as an RHCP or an LHCP, or the polarization may be a linear polarization, such as a vertical linear polarization or a horizontal linear polarization. In example 500, the polarization is a circular RHCP polarization.

As shown by reference number 502, a coverage area (e.g., of 2 regions) may be served by two polarizations to increase a system capacity. The two polarizations may be associated with a same frequency, or the two polarizations may be associated with different frequencies. Two polarizations for the coverage area served by satellite 320 may be beneficial when the coverage area is associated with a dense constellation of UEs. The two polarizations may be circular polarizations, or the two polarizations may be linear polarizations, or the two polarizations may be linear polarization and a circular polarization. In example 502, the polarizations are a circular RHCP and a linear vertical polarization.

As indicated above, FIG. 5 provides some examples. Other examples may differ from what is described with regard to FIG. 5.

FIG. 6A is a diagram illustrating an example of using beams for communications between a base station and a UE, in accordance with the present disclosure. As shown in FIG. 6A, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 605.

The UE 120 may attempt to receive downlink transmissions via one or more UE receive beams 610, which may be configured using different beamforming parameters at receive circuitry of the UE 120. The UE 120 may identify a particular BS transmit beam 605, shown as BS transmit beam 605-A, and a particular UE receive beam 610, shown as UE receive beam 610-A, that provide relatively favorable performance (for example, that have a best channel quality of the different measured combinations of BS transmit beams 605 and UE receive beams 610). In some examples, the UE 120 may transmit an indication of which BS transmit beam 605 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 605-A and the UE receive beam 610-A), which may be further refined and maintained in accordance with one or more established beam refinement procedures.

A downlink beam, such as a BS transmit beam 605 or a UE receive beam 610, may be associated with a TCI state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 605 may be associated with an SSB, and the UE 120 may indicate a preferred BS transmit beam 605 by transmitting uplink transmissions in resources of the SSB that are associated with the preferred BS transmit beam 605. A particular SSB may have an associated TCI state (for example, for an antenna port or for beamforming). The base station 110 may, in some examples, indicate a downlink BS transmit beam 605 based at least in part on antenna port QCL properties that may be indicated by the TCI state. A TCI state may be associated with one downlink reference signal set (for example, an SSB and an aperiodic, periodic, or semi-persistent CSI-RS) for different QCL types (for example, QCL types for different combinations of Doppler shift, Doppler spread, average delay, delay spread, or spatial receive parameters, among other examples). In one or more examples where the QCL type indicates spatial receive parameters, the QCL type may correspond to analog receive beamforming parameters of a UE receive beam 610 at the UE 120. Thus, the UE 120 may select a corresponding UE receive beam 610 from a set of BPLs based at least in part on the base station 110 indicating a BS transmit beam 605 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission (on a PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

FIG. 6B is a diagram illustrating another example of using beams for communications between a base station and a UE, in accordance with the present disclosure. As shown in FIG. 6B, the base station 110 and the UE 120 may communicate with one another.

For uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 615.

The base station 110 may receive uplink transmissions via one or more BS receive beams 620. The base station 110 may identify a particular UE transmit beam 615, shown as UE transmit beam 615-A, and a particular BS receive beam 620, shown as BS receive beam 620-A, that provide relatively favorable performance (for example, that have a best channel quality of the different measured combinations of UE transmit beams 615 and BS receive beams 620). In some examples, the base station 110 may transmit an indication of which UE transmit beam 615 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 615-A and the BS receive beam 620-A), which may be further refined and maintained in accordance with one or more established beam refinement procedures. An uplink beam, such as a UE transmit beam 615 or a BS receive beam 620, may be associated with a spatial relation. A spatial relation may indicate a directionality or a characteristic of the uplink beam, similar to one or more QCL properties, as described above. For example, a spatial relation parameter may be associated with QCL-Type D 625.

Figure 6C:
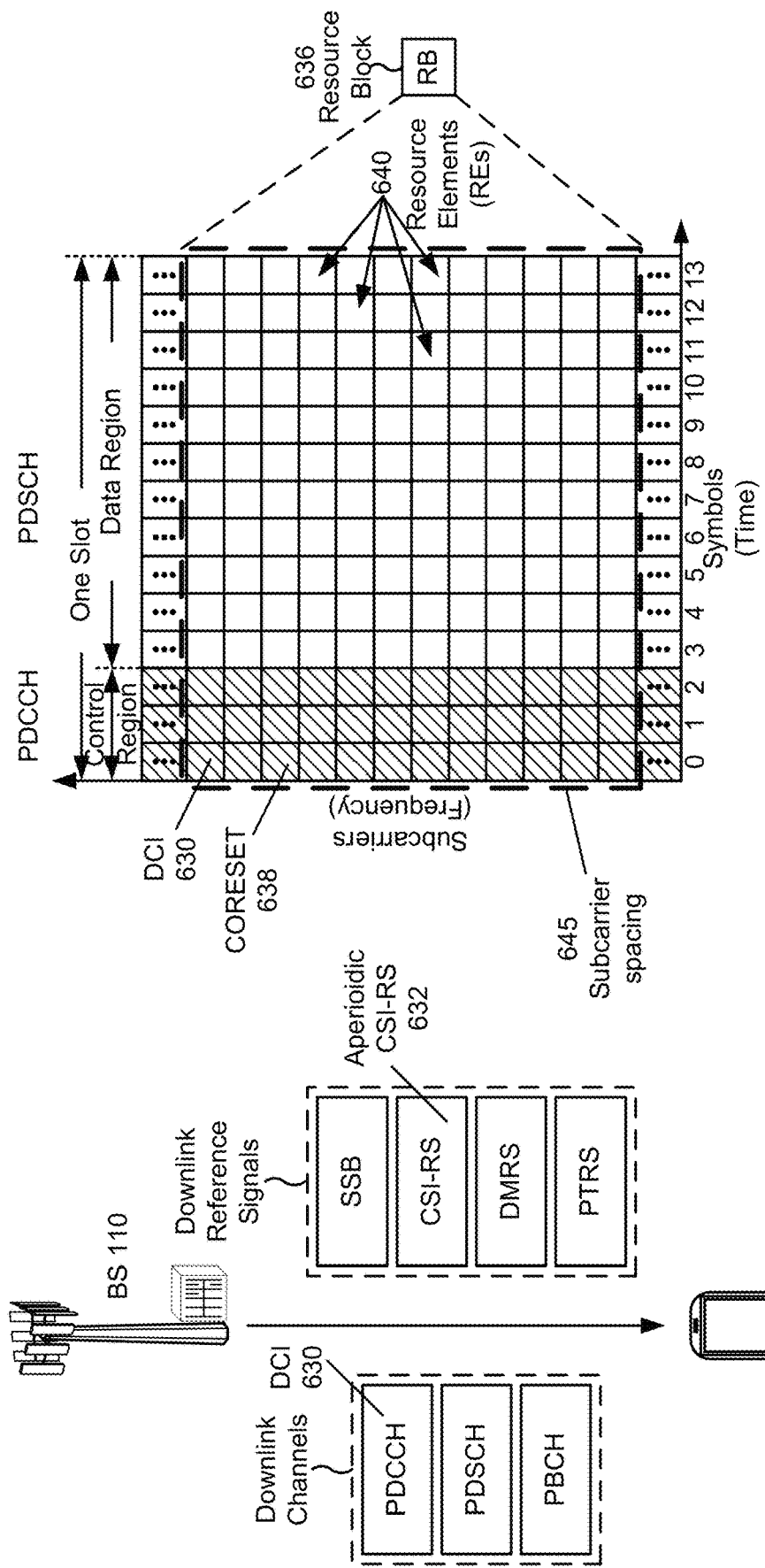
FIG. 6C is a diagram illustrating an example of a physical channel and reference signals in a wireless network, in accordance with the present disclosure.

FIG. 6C is a diagram illustrating an example of a physical channel and reference signals in a wireless network, in accordance with the present disclosure. As shown in FIG. 6C, downlink channels and downlink reference signals may carry information from a base station 110 to a UE 120. The base station 110 may be an NTN entity (e.g., satellite 320) or may transmit and receive via an NTN entity.

A downlink channel may include a PDCCH that carries downlink control information (DCI) 630, a PDSCH that carries downlink data, or a physical broadcast channel (PBCH) that carries system information, among other examples. In some aspects, PDSCH communications may be scheduled by PDCCH communications, including the DCI 630. A downlink reference signal may include an SSB, a CSI-RS, a DMRS, a positioning reference signal (PRS), or a phase tracking reference signal (PTRS), among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, an NTN entity (e.g., base station, relay station) may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The CSI-Rs may be, for example, an aperiodic CSI-RS 632. The NTN entity may configure a set of CSI-RSs for the UE, and the UE may measure the configured set of CSI-RSs. Based at least in part on the measurements, the UE may perform channel estimation and may report channel estimation parameters to the NTN entity (e.g., in a CSI report), such as a CQI, a precoding matrix indicator (PMI), a CSI-RS resource indicator (CRI), a layer indicator (LI), a rank indicator (RI), or an RSRP, among other examples. The NTN entity or a base station may use the CSI report to select transmission parameters for downlink communications to the UE, such as a number of transmission layers (e.g., a rank), a precoding matrix (e.g., a precoder), an MCS, or a refined downlink beam (e.g., using a beam refinement procedure or a beam management procedure), among other examples.

FIG. 6C also shows a slot format, in accordance with the present disclosure. As shown in FIG. 6C, time-frequency resources in a radio access network may be partitioned into resource blocks, shown by a single resource block (RB) 636. An RB 636 is sometimes referred to as a physical resource block (PRB). An RB 636 includes a set of subcarriers (e.g., 12 subcarriers) and a set of symbols (e.g., 14 symbols) that are schedulable by a base station 110 as a unit. In some aspects, an RB 636 may include a set of subcarriers in a single slot. As shown, a single time-frequency resource included in an RB 636 may be referred to as a resource element (RE) 640. An RE 640 may include a single subcarrier (e.g., in frequency) and a single symbol (e.g., in time). A symbol may be referred to as an orthogonal frequency division multiplexing (OFDM) symbol. An RE 640 may be used to transmit one modulated symbol, which may be a real value or a complex value. The DCI 630 may be found in a control region (e.g., PDCCH).

In some telecommunication systems (e.g., NR), RBs 636 may span 12 subcarriers with a subcarrier spacing (SCS) 645 of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured.

Figure 6D:
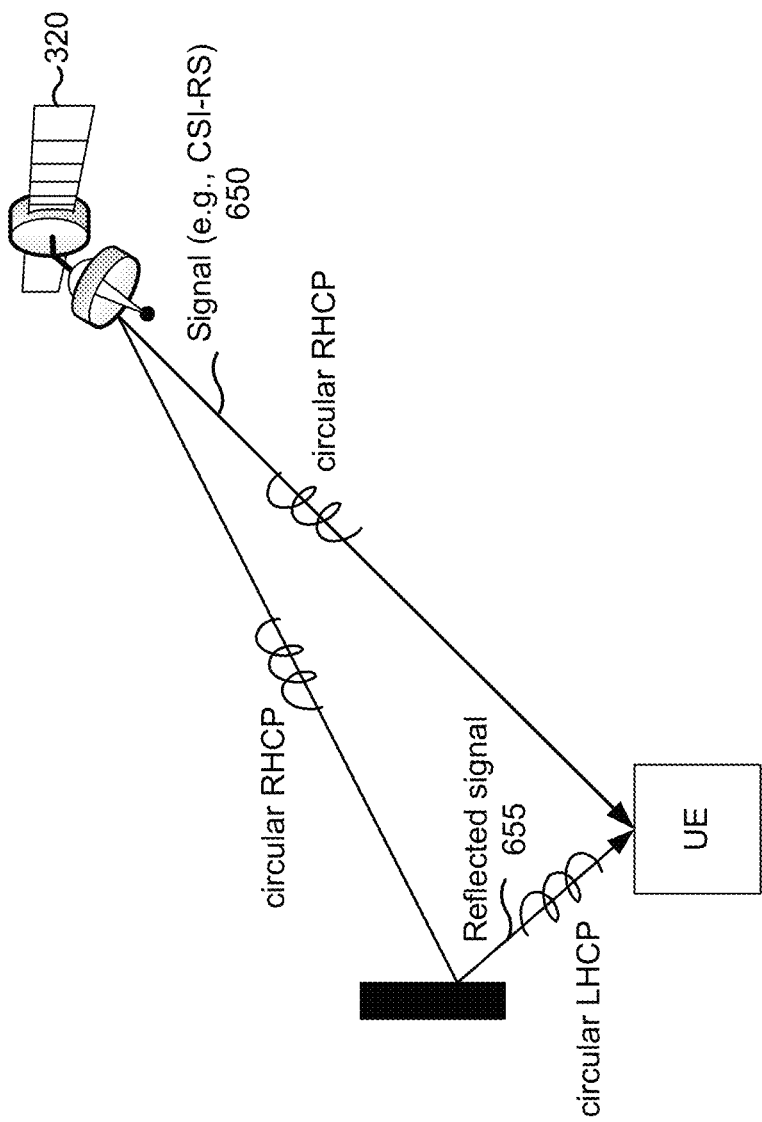
FIG. 6D is a diagram illustrating an example of a signal and a reflected signal, in accordance with aspects of the present disclosure.

FIG. 6D is a diagram illustrating an example of a signal 650 and a reflected signal 655, in accordance with aspects of the present disclosure. A base station, such as an NTN entity (e.g., satellite 320), may transmit a CSI-RS with a polarization, including a circular polarization. However, an antenna configuration of a UE (e.g., UE 120) may not be arranged for the same polarization as the CSI-RS. This may be due to a reflection of the signal 650 carrying the CSI-RS, which changes a polarization of the signal. In fact, the reflected signal 655 may have a polarization that is the same polarization, an orthogonal polarization, or a polarization that is neither the same polarization nor an orthogonal polarization. For example, a CSI-RS may have an RHCP at the point of transmission from satellite 320, but after being reflected off a wall, the CSI-RS may have an LHCP when the CSI-RS is received by the UE. If the UE is expecting the CSI-RS to be RHCP (based on a signaled polarization of the CSI-RS), the antennas will be configured for RHCP. However, if the reflected CSI-RS is LHCP, the difference between RHCP and LHCP may result in a polarization mismatch loss that causes a measurement of the reference signal to be inaccurate or to fail. Inaccurate measurements can degrade communications or cause retransmissions that would be a waste of power, processing resources, and signaling resources.

A base station may indicate a polarization (e.g., circular polarization) to a UE. In some aspects, the polarization indication may indicate a polarization relationship between a source transmission and a target transmission with respect to the base station and the UE. In some aspects, the polarization indication may indicate a polarization associated with a downlink transmission or an uplink transmission. The polarization indication may help to avoid a polarization mismatch loss at the UE, which may occur when the UE cannot detect the polarization and a mismatch occurs between a transmit polarization and a receive polarization. Even when the UE has a capability to detect the polarization, the polarization indication signaling may reduce an amount of processing that occurs at the UE.

In some aspects, a configuration for the downlink may indicate a polarization relationship between the downlink transmission and a reference signal (e.g., an SSB or a CSI-RS), and the UE may derive the polarization of the downlink transmission based at least in part on the polarization relationship indicated in the downlink configuration. The polarization relationship may be a parameter included in a TCI state (shown in FIG. 6A), which may be part of the downlink configuration transmitted from the base station to the UE. A TCI state may indicate a directionality or a characteristic of the downlink beam, such as one or more QCL properties of the downlink beam.

In some aspects, the downlink configuration may explicitly indicate the polarization associated with the downlink transmission. The polarization associated with the downlink transmission may correspond to a polarization associated with the reference signal (e.g., an SSB or a CSI-RS), or the polarization associated with the downlink transmission may be different (e.g., orthogonal) than the polarization associated with the reference signal.

A base station may, similar to current TCI state indications, dynamically indicate a polarization TCI state and use DCI scheduling (e.g., DCI 630) to switch the polarization TCI state for a PDSCH communication or for an aperiodic CSI-RS. Changing a TCI state associated with QCL-Type A, B or C may only involve the UE's baseband processing, while changing a TCI state associated with QCL-Type D 625 may involve the UE programming its analog modules, which takes longer. For QCL-Type D 625, this delay is also called the beam switching time. A minimum beam switching time for the new QCL-Type D 625 to take effect may be reported by the UE as a UE capability. The UE capability may correspond to how quickly the UE is able to reconfigure one or more antennas for a different beam. For QCL-Type D 625, UE capabilities may be defined separately for PDSCH and aperiodic CSI-RS.

The UE may also be limited as to how quickly the UE may switch polarizations, including from a first circular polarization and/or to a second circular polarization. According to various aspects described herein, the UE may indicate a UE capability for switching polarizations, which is separate from a UE capability for switching beams. The UE capability may be specific to switching from a first circular polarization and/or to a second circular polarization, from a first linear polarization to a second linear polarization, from a linear polarization to a circular polarization, or from a circular polarization to a linear polarization. The UE capability may correspond to how long the UE takes to switch to the second polarization after receiving an indication of a polarization switch in the DCI 630 on a PDCCH. This may be referred to as a minimum polarization switching time. For example, a UE capability for switching polarizations may include the minimum quantity of OFDM symbols required by the UE to apply polarization information after receiving the information in the DCI 630 for PDSCH processing. The UE capability may include the minimum quantity of OFDM symbols required by the UE to apply polarization information after receiving the information in the DCI 630 for a triggered aperiodic CSI-RS. In some aspects, the UE may reuse the corresponding minimum supported beam switching time for QCL-Type D 625 or use a default polarization when the polarization cannot be explicitly determined from the DCI 630. The UE, by indicating a UE capability for switching polarizations, may ensure that the base station will provide the UE sufficient time to switch polarizations. Alternatively, the UE may default to a particular polarization if there is not sufficient time. As a result, the UE and the base station may avoid losses in signal strength that may waste processing resources and signaling resources.

As indicated above, FIGS. 6A, 6B, 6C, and 6D are provided as examples. Other examples may differ from what is described with regard to FIGS. 6A, 6B, 6C, and 6D.

Figure 7A:
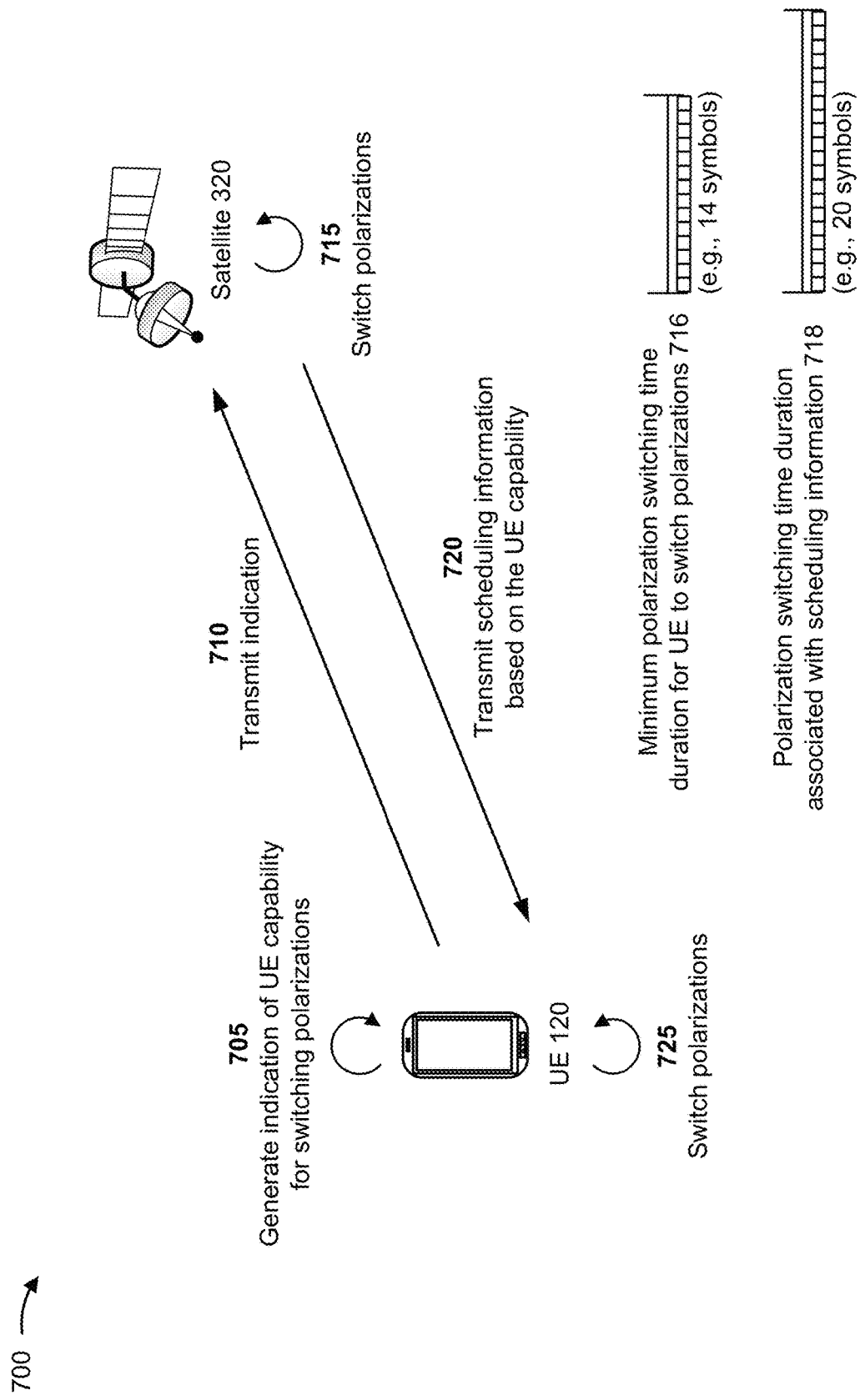
FIG. 7A is a diagram illustrating an example of indicating a UE capability for switching polarizations, in accordance with the present disclosure.

FIG. 7A is a diagram illustrating an example 700 of indicating a UE capability for switching polarizations, in accordance with the present disclosure. As shown, FIG. 7A includes an NTN entity (e.g., satellite 320) (e.g., base station, relay station) and a UE 120. In some aspects, the UE 120 may include a ground station.

As shown by reference number 705, the UE 120 may generate an indication of a UE capability for switching polarizations. In example 700, the UE capability for switching polarizations may be for switching from a first circular polarization to a second circular polarization, switching from a linear polarization to a circular polarization, or switching from a circular polarization to a linear polarization. However, the operations described in connection with example 700 may also apply to switching from a first linear polarization to a second linear polarization. The indication may include a type of the UE capability, a value for the UE capability (e.g., quantity of symbols, quantity of time slots), or a combination thereof. The UE 120 may generate the indication based at least in part on a type of the UE 120, an antenna configuration, a status of the UE 120, historical timing information for switching polarizations, or a combination thereof. In some aspects, the UE capability may correspond to a minimum polarization switching time of the UE 120. The UE capability may include the minimum quantity of OFDM symbols (or time units or slots) required by the UE to apply polarization information after receiving the polarization information in DCI for PDSCH processing. The UE capability may include the minimum quantity of OFDM symbols required by the UE to apply polarization information after receiving the polarization information in DCI for a triggered aperiodic CSI-RS.

As shown by FIG. 7A and by reference number 710, the UE 120 may transmit the indication of the UE capability for switching polarizations, such as switching circular polarizations. The UE 120 may transmit the indication in uplink control information (UCI) or a medium access control control element (MAC CE). The satellite 320 may generate a scheduling message based at least in part on the UE capability. For example, the UE 120 may indicate that the UE capability of the UE 120 for switching polarizations is a minimum polarization switching time duration 716 of 14 symbols. Other minimum polarization switching times may include 28 symbols or 48 symbols, among other examples. Accordingly, the satellite 320 may generate scheduling information that provides a polarization switching time duration 718 of, for example, 20 symbols for the UE 120 to switch polarizations. As 20 symbols is greater than 14 symbols, the UE 120 may have time to switch polarizations. As shown by reference number 715, the satellite 320 may switch polarizations. As shown by reference number 720, the satellite 320 may transmit the scheduling information. The satellite 320 may transmit the scheduling information in scheduling DCI. As shown by reference number 725, the UE 120 may also switch circular polarizations. The UE 120 may switch polarizations based at least in part on the scheduling information received from the satellite 320.

Alternatively, the UE 120 may not receive or process scheduling information for transmitting or receiving a communication, or the polarization switching time duration 718 indicated in the scheduling information may not be large enough for the minimum polarization switching time duration 716. In such scenarios, the UE 120 may reuse a minimum beam switching time supported by the UE 120 for QCL-Type D as a polarization switching time. In some aspects, the minimum beam switching time UE capability may be defined as timeDurationForQCL for PDSCH and beamSwitchTiming for aperiodic CSI-RS. The UE 120 may also use a value of a UE capability for switching polarizations that is dedicated to switching polarizations.

QCL-Type D has been defined only for FR2 for an SCS (e.g., SCS 645) of 60 kHz and 12 kHz. Polarization may be adopted for FR1, such as for high platforms (HAPS)-based NTN. In some aspects, UE capabilities for switching polarizations for PDSCH and aperiodic CSI-RS reception may be defined for an SCS of 15 kHz or 30 kHz for FR1.

If dynamic polarization indication is supported, there are scenarios in which a default polarization may be defined. For example, the polarization information may be absent from the DCI scheduling PDSCH, or the scheduling or triggering offset (polarization switching time duration 718) between the DCI and the PDSCH or aperiodic CSI-RS may be smaller than the UE reported capability for the supported minimum polarization switching time duration 716. In such scenarios, the UE 120 may use the default polarization if the polarization cannot be explicitly determined from the DCI. The UE 120 may determine the default polarization (e.g., default circular polarization) in a similar way that the default QCL-Type D is determined. For DCI scheduling a PDSCH communication, if the scheduling offset between the PDCCH communication (e.g., DCI) and the PDSCH communication is smaller than the minimum polarization switching time duration 716 or if the polarization indication is absent from the DCI, the UE 120 may obtain the polarization for the scheduled PDSCH from the activated polarization TCI state with, for example, the lowest TCI state identifier (ID) applicable to the PDSCH in the active bandwidth part (BWP) of the scheduled cell.

In some aspects, if a triggering time offset for an aperiodic CSI-RS 632 is smaller than the minimum polarization switching time duration 716, if the aperiodic CSI-RS 632 is configured with a polarization TCI state, and if there is another downlink signal in the same symbols as the CSI-RS in the scheduled cell, the UE 120 may apply the polarization of the other downlink signal for the aperiodic CSI-RS 632. Otherwise, if a control resource set (CORESET) 638 is configured in the aperiodic CSI-RS carrier, the UE 120 may use the polarization of the lowest ID CORESET in the latest slot in which one or more CORESETs within the active BWP of the serving cell are monitored. If a CORESET 638 is not configured in the aperiodic CSI-RS carrier, the UE 120 may apply the polarization in the activated polarization TCI state with the lowest ID applicable to a PDSCH in the active BWP of the serving cell with the aperiodic CSI-RS 632.

The other downlink signal may include a PDSCH communication scheduled with a scheduling offset greater than or equal to the minimum polarization switching time duration 716. The other downlink signal may include another aperiodic CSI-RS triggered with a triggering offset greater than or equal to the minimum polarization switching time duration 716. The other downlink signal may include a periodic CSI-RS or a semi-persistent CSI-RS. If there is a PDSCH communication indicated with two polarization TCI states in the same symbols as the aperiodic CSI-RS 632, the UE 120 may apply the first TCI state of the two TCI states when receiving the aperiodic CSI-RS 632. By using a default polarization when a polarization is not indicated, the UE 120 may conserve processing resources and signaling resources that would otherwise be wasted due to a polarization mismatch power loss.

Figure 7B:
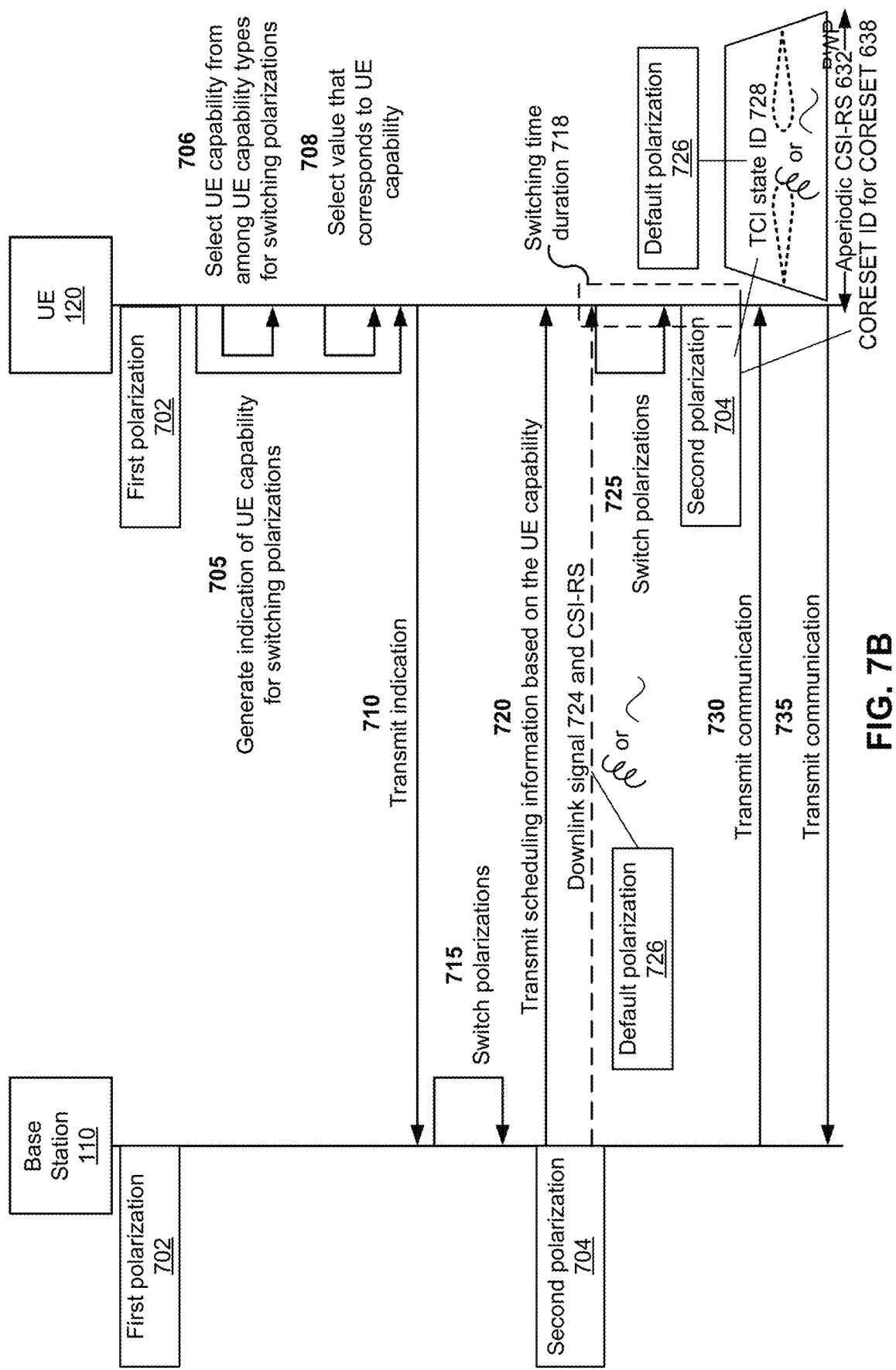
FIG. 7B is a diagram illustrating an example of a call flow for indicating a UE capability for switching polarizations, in accordance with the present disclosure.

FIG. 7B is a diagram illustrating an example of a call flow for indicating a UE capability for switching polarizations, in accordance with the present disclosure. FIG. 7B corresponds to the operations described for FIG. 7A. The base station 110 and the UE 120 may have an antenna panel configured for a first polarization 702. The base station 110 and the UE 120 may have a capability of switching to a second polarization 704.

As shown by reference number 705, the UE 120 may generate an indication of a UE capability for switching polarizations. The UE capability type may be dedicated to indicating a indicating a switching time duration in which the UE is to switch polarizations. In some aspects, this may include selecting the UE capability from one or more UE capability types for switching polarizations, as shown by reference number 706. For example, a first UE capability type may be for switching from a first circular polarization to a second polarization within a first switching time duration (e.g., first quantity of symbols). A second UE capability type may be for switching from the first circular polarization to the second polarization within a second switching time duration (e.g., second quantity of symbols). A third UE capability type may be for switching from the first circular polarization to a first linear polarization within a third switching time duration. Other UE capability types may involve other combinations of polarizations and/or other switching time durations. As shown by reference number 708, generating the indication may also include selecting a value that corresponds to the selected UE capability. The value may be included in the indication.

As shown by reference number 710, the UE 120 may transmit the indication of the UE capability for switching polarizations. As shown by reference number 715, the base station 110 may switch from the first polarization 702 to the second polarization 704 based at least in part on the indication. As shown by reference number 720, the base station 110 may transmit scheduling information based at least in part on the UE capability. The scheduling information may include a polarization switching time duration 718 for the UE 120 to switch polarizations.

As shown by reference number 725, the UE 120 may switch from the first polarization 702 to the second polarization 704 within the polarization switching time duration 718. In some aspects, if the polarization switching time duration 718 is less than the minimum polarization switching time duration 716 of the UE capability of the UE 120, the UE 120 may switch to a default polarization 726. The default polarization 726 may be a preconfigured polarization or a polarization that is determined from a polarization of a downlink signal 724 received from the base station 110 in a same symbol as an aperiodic CSI-RS. The default polarization may correspond to an activated polarization TCI state with a lowest ID 728 applicable to a PDSCH in an active bandwidth part of a serving cell.

In some aspects, the UE 120 may switch to a polarization that corresponds to a lowest CORESET ID in a most recent slot in which one or more CORESETs within an active BWP of a serving cell are monitored, if a CORESET 638 is configured in an aperiodic CSI-RS carrier 632. The UE 120 may switch to a polarization that corresponds to an activated polarization TCI state with a lowest ID applicable to a PDSCH in an active BWP of a serving cell with an aperiodic CSI-RS carrier 632, if a CORESET 638 is not configured in an aperiodic CSI-RS carrier 632.

As shown by reference number 730, the base station 110 may transmit a communication with the second polarization 704, and the UE 120 may receive the communication with the second polarization 704. As shown by reference number 735, the UE 120 may transmit a communication with the second polarization 704, and the base station 110 may receive the communication with the second polarization 704.

By providing the indication of the UE capability for switching polarizations, the UE 120 may better coordinate polarizations with the base station 110. The base station 110 and the UE 120 may avoid decreased signal strengths when the UE 120 is not able to switch polarizations in time.

As indicated above, FIGS. 7A and 7B are provided as examples. Other examples may differ from what is described with regard to FIGS. 7A and 7B.

Figure 8:
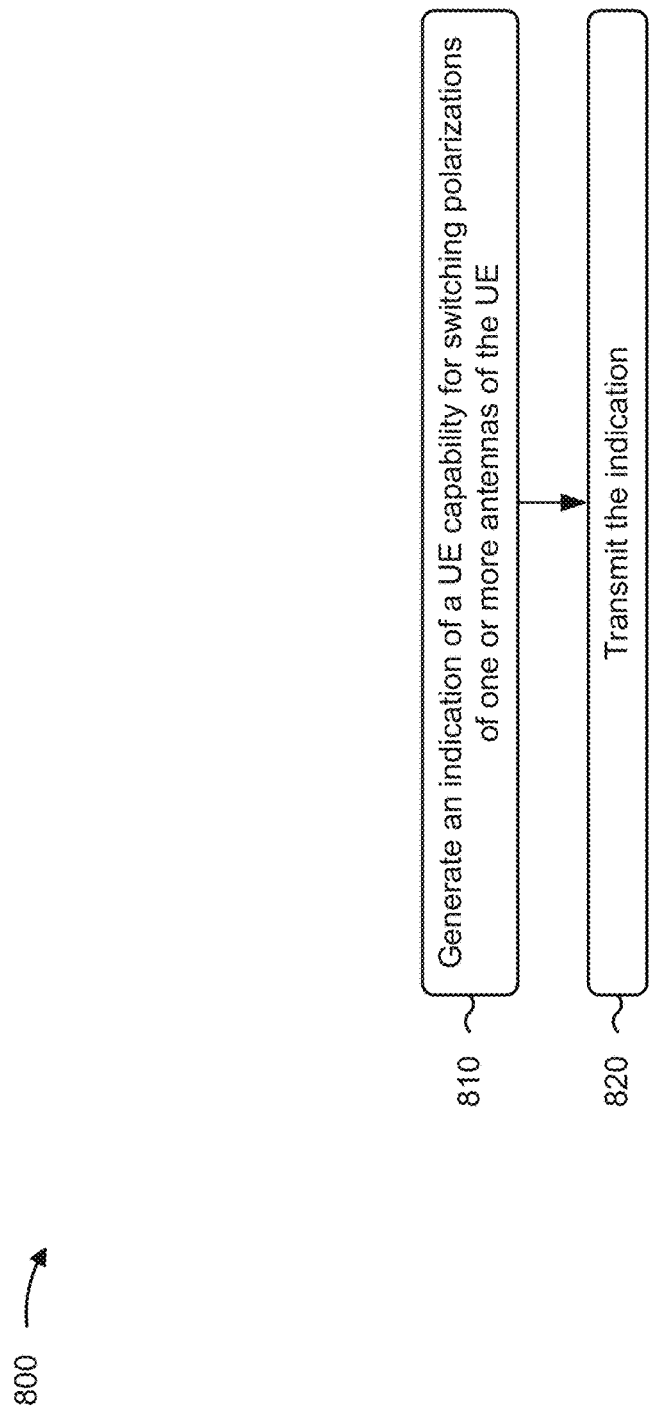
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with indicating a UE capability for switching polarizations.

As shown in FIG. 8, in some aspects, process 800 may include generating an indication of a UE capability for switching polarizations of one or more antennas of the UE (block 810). For example, the UE (e.g., using communication manager 140 and/or generation component 1108 depicted in FIG. 11) may generate an indication of a UE capability for switching polarizations of one or more antennas of the UE, as described above. The UE capability for switching polarizations includes a UE capability for switching from a linear polarization to a circular polarization, switching from a first circular polarization to a second polarization, or switching from a circular polarization to a linear polarization. The UE capability may include a UE capability for switching from a first linear polarization to a second linear polarization.

As further shown in FIG. 8, in some aspects, process 800 may include transmitting the indication (block 820). For example, the UE (e.g., using communication manager 140 and/or transmission component 1104 depicted in FIG. 11) may transmit the indication, as described above.

Process 800 may include additional aspects, such as any single aspect or any combination of aspects described below and/or in connection with one or more other processes described elsewhere herein.

In a first aspect, the UE capability includes a switching time duration for switching polarizations.

In a second aspect, alone or in combination with the first aspect, the switching time duration is a minimum quantity of symbols between receiving DCI and applying a new polarization indicated by the DCI for processing a PDSCH.

In a third aspect, alone or in combination with one or more of the first and second aspects, the switching time duration is a minimum quantity of symbols between receiving DCI and applying a new polarization indicated by the DCI for a triggered aperiodic CSI-RS.

In a fourth aspect, alone or in combination with one or more of the first through third aspects, generating the indication includes selecting the UE capability from among one or more (e.g., multiple) UE capability types for switching polarizations, and selecting a value that corresponds to the UE capability.

In a fifth aspect, alone or in combination with one or more of the first through fourth aspects, the UE capability is for a PDSCH communication received in association with an SCS of 15 kHz or 30 kHz in FR1, or for an aperiodic CSI-RS received in association with an SCS of 15 kHz or 30 kHz in FR1.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
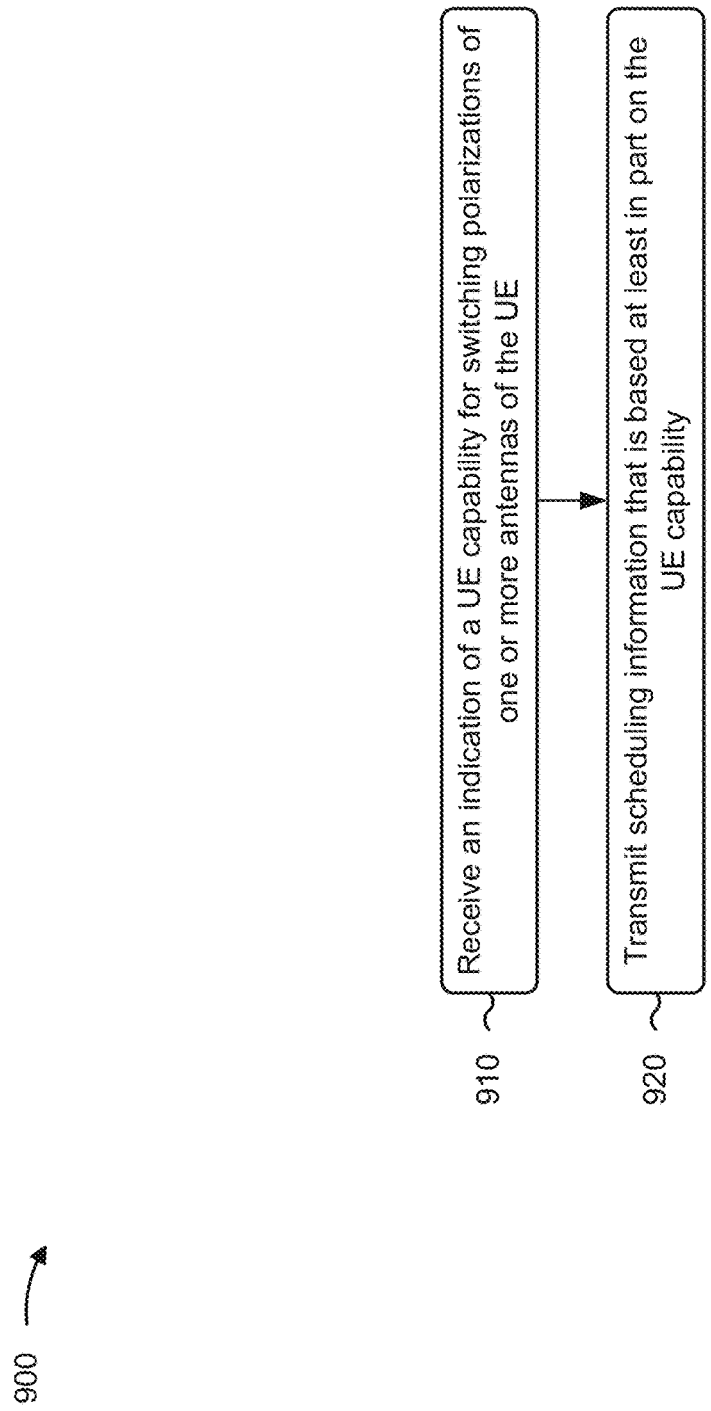
FIG. 9 is a diagram illustrating an example process performed, for example, by a base station, in accordance with the present disclosure.

FIG. 9 is a diagram illustrating an example process 900 performed, for example, by a base station, in accordance with the present disclosure. Example process 900 is an example where the base station (e.g., base station 110) performs operations associated with using a UE capability for switching polarizations.

As shown in FIG. 9, in some aspects, process 900 may include receiving, from a UE, an indication of a UE capability for switching polarizations of one or more antennas of the UE (block 910). For example, the base station (e.g., using communication manager 150 and/or reception component 1402 depicted in FIG. 14) may receive, from a UE, an indication of a UE capability for switching polarizations of one or more antennas of the UE, as described above. The UE capability includes a UE capability to switch from a first polarization of the one or more antennas (an antenna panel) of the UE to a second polarization of the one or more antennas (the antenna panel) of the UE. For example, the UE capability for switching polarizations includes a UE capability for switching from a linear polarization to a circular polarization, switching from a first circular polarization to a second polarization, or switching from a circular polarization to a linear polarization. The UE capability may include a UE capability for switching from a first linear polarization to a second linear polarization.

As further shown in FIG. 9, in some aspects, process 900 may include transmitting, in DCI to the UE, scheduling information that is based at least in part on the UE capability (block 920). For example, the base station (e.g., using communication manager 150 and/or transmission component 1404 depicted in FIG. 14) may transmit, in DCI to the UE, scheduling information that is based at least in part on the UE capability, as described above.

Process 900 may include additional aspects, such as any single aspect or any combination of aspects described below and/or in connection with one or more other processes described elsewhere herein.

In a first aspect, the DCI indicates a new polarization for the UE.

In a second aspect, alone or in combination with the first aspect, the UE capability indicates a switching time duration that is a minimum quantity of symbols between the UE receiving the DCI and the UE applying the new polarization for processing a PDSCH.

In a third aspect, alone or in combination with one or more of the first and second aspects, the UE capability indicates a switching time duration that is a minimum quantity of symbols between the UE receiving the DCI and the UE applying the new polarization for a triggered aperiodic CSI-RS.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
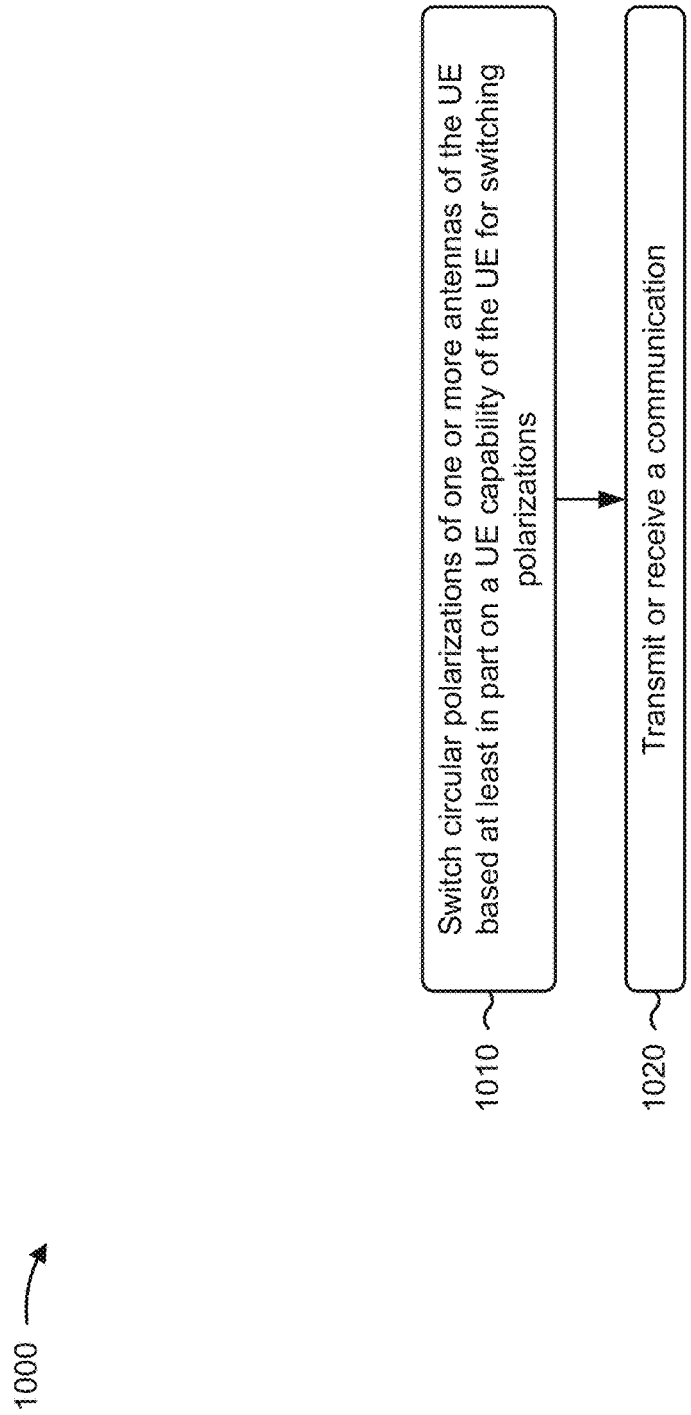
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with switching polarizations.

As shown in FIG. 10, in some aspects, process 1000 may include switching polarizations of one or more antennas of the UE based at least in part on a UE capability of the UE for switching polarizations (block 1010). For example, the UE (e.g., using communication manager 140 and/or switching component 1708 depicted in FIG. 17) may switch polarizations of one or more antennas of the UE based at least in part on a UE capability of the UE for switching polarizations, as described above. The UE capability for switching polarizations includes a UE capability for switching from a linear polarization to a circular polarization, switching from a first circular polarization to a second polarization, or switching from a circular polarization to a linear polarization. The UE capability may include a UE capability for switching from a first linear polarization to a second linear polarization.

As further shown in FIG. 10, in some aspects, process 1000 may include transmitting or receiving a communication (block 1020). For example, the UE (e.g., using communication manager 140 and/or transmission component 1704 depicted in FIG. 17) may transmit or receive a communication, as described above.

Process 1000 may include additional aspects, such as any single aspect or any combination of aspects described below and/or in connection with one or more other processes described elsewhere herein.

In a first aspect, a switching time duration associated with the UE capability for switching polarizations corresponds to a minimum supported beam switching time for QCL Type D.

In a second aspect, alone or in combination with the first aspect, the UE capability is of a UE capability type that is dedicated to indicating a switching time duration in which the UE is to switch polarizations.

In a third aspect, alone or in combination with one or more of the first and second aspects, switching polarizations includes switching to a default polarization if an indication of a polarization is absent in DCI or if an offset between the DCI and a PDSCH communication or an aperiodic CSI-RS is smaller than a switching time duration associated with the UE capability for switching polarizations.

In a fourth aspect, alone or in combination with one or more of the first through third aspects, the default polarization corresponds to an activated polarization transmission configuration indicator state with a lowest ID applicable to a PDSCH in an active bandwidth part of a serving cell.

In a fifth aspect, alone or in combination with one or more of the first through fourth aspects, the default polarization corresponds to a polarization of a downlink signal that is to be received in a same symbol as an aperiodic CSI-RS.

In a sixth aspect, alone or in combination with one or more of the first through fifth aspects, the downlink signal is another PDSCH communication with an offset that is greater than or equal to a switching time duration associated with the UE capability for switching polarizations.

In a seventh aspect, alone or in combination with one or more of the first through sixth aspects, the other PDSCH communication has a first polarization TCI state and a second polarization TCI state, and switching polarizations includes switching to a polarization of the first polarization TCI state.

In an eighth aspect, alone or in combination with one or more of the first through seventh aspects, the downlink signal is another aperiodic CSI-RS with a triggering offset that is greater than or equal to a switching time duration associated with the UE capability for switching polarizations.

In a ninth aspect, alone or in combination with one or more of the first through eighth aspects, the downlink signal is a periodic CSI-RS or a semi-persistent CSI-RS.

In a tenth aspect, alone or in combination with one or more of the first through ninth aspects, switching polarizations includes switching to a polarization that corresponds to a lowest CORESET ID in a most recent slot in which one or more CORESETs within an active bandwidth part of a serving cell are monitored, if a CORESET is configured in an aperiodic CSI-RS carrier.

In an eleventh aspect, alone or in combination with one or more of the first through tenth aspects, switching polarizations includes switching to a polarization that corresponds to an activated polarization transmission configuration indicator state with a lowest ID applicable to a PDSCH in an active BWP of a serving cell with an aperiodic CSI-RS carrier, if a CORESET is not configured in an aperiodic CSI-RS carrier.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
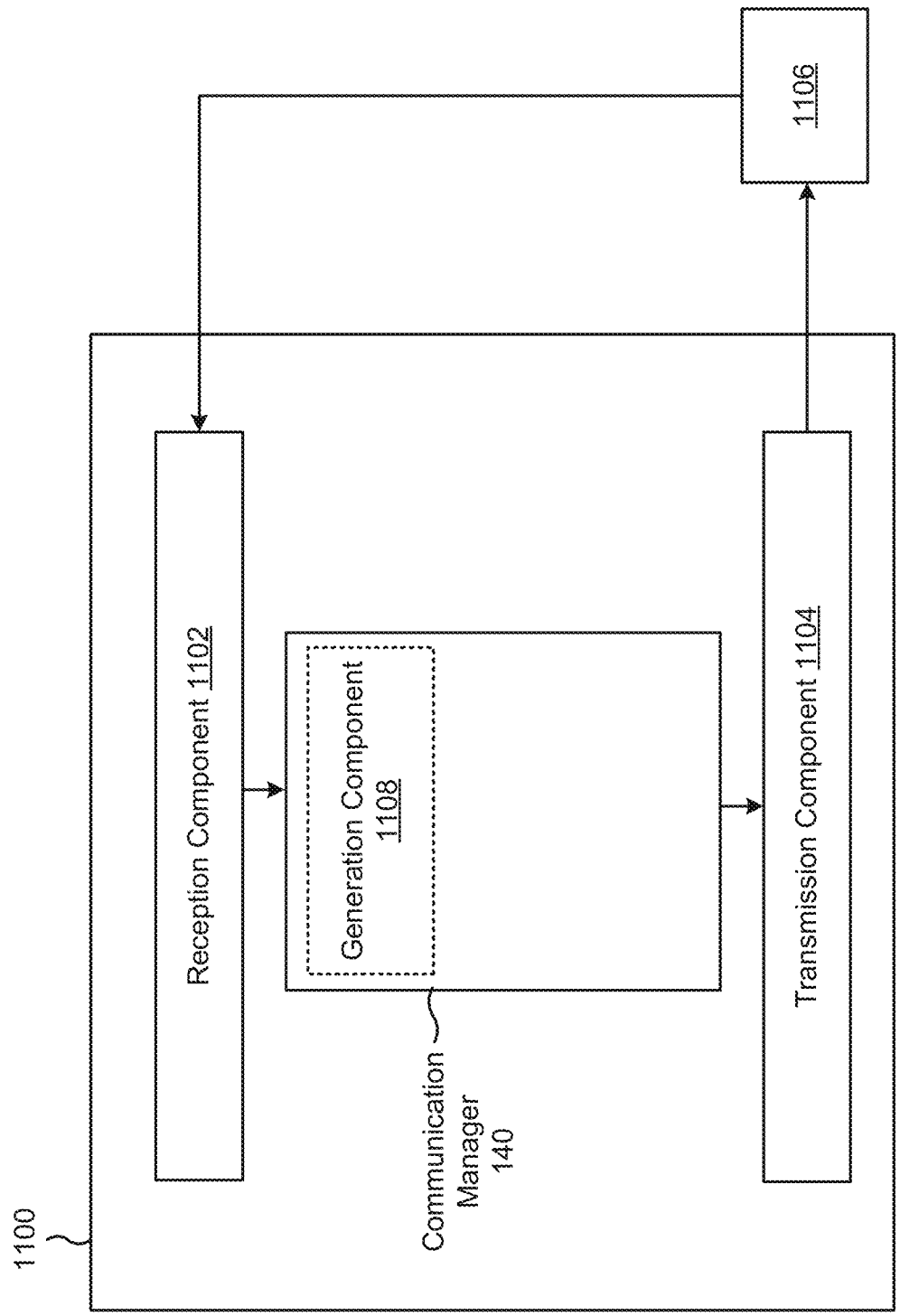
FIG. 11 is a diagram of an example apparatus for wireless communication, in accordance with the present disclosure.

FIG. 11 is a diagram of an example apparatus 1100 for wireless communication. The apparatus 1100 may be a UE (e.g., UE 120), or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, an NTN entity, or another wireless communication device) using the reception component 1102 and the transmission component 1104. As further shown, the apparatus 1100 may include the communication manager 140. The communication manager 140 may include a generation component 1108, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 800 of FIG. 8. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The generation component 1108 may generate an indication of a UE capability for switching polarizations of one or more antennas of the UE. The transmission component 1104 may transmit the indication.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
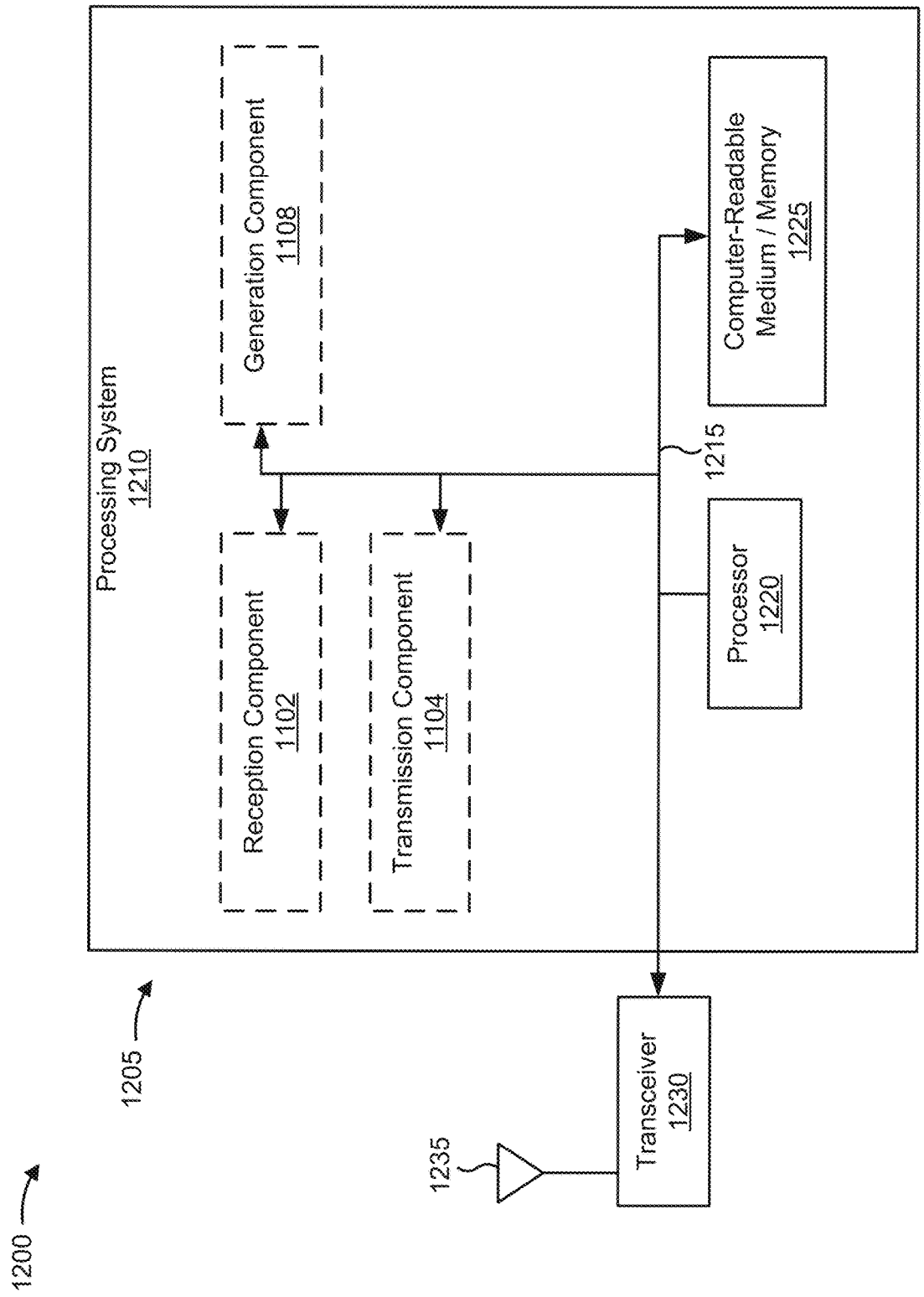
FIG. 12 is a diagram illustrating an example of a hardware implementation for an apparatus employing a processing system, in accordance with the present disclosure.

FIG. 12 is a diagram illustrating an example 1200 of a hardware implementation for an apparatus 1205 employing a processing system 1210. The apparatus 1205 may be a UE (e.g., UE 120).

The processing system 1210 may be implemented with a bus architecture, represented generally by the bus 1215. The bus 1215 may include any number of interconnecting buses and bridges depending on the specific application of the processing system 1210 and the overall design constraints. The bus 1215 links together various circuits including one or more processors and/or hardware components, represented by the processor 1220, the illustrated components, and the computer-readable medium/memory 1225. The bus 1215 may also link various other circuits, such as timing sources, peripherals, voltage regulators, and/or power management circuits.

The processing system 1210 may be coupled to a transceiver 1230. The transceiver 1230 is coupled to one or more antennas 1235. The transceiver 1230 provides a means for communicating with various other apparatuses over a transmission medium. The transceiver 1230 receives a signal from the one or more antennas 1235, extracts information from the received signal, and provides the extracted information to the processing system 1210, specifically the reception component 1102. In addition, the transceiver 1230 receives information from the processing system 1210, specifically the transmission component 1104, and generates a signal to be applied to the one or more antennas 1235 based at least in part on the received information.

The processing system 1210 includes a processor 1220 coupled to a computer-readable medium/memory 1225. The processor 1220 is responsible for general processing, including the execution of software stored on the computer-readable medium/memory 1225. The software, when executed by the processor 1220, causes the processing system 1210 to perform the various functions described herein for any particular apparatus. The computer-readable medium/memory 1225 may also be used for storing data that is manipulated by the processor 1220 when executing software. The processing system further includes at least one of the illustrated components. The components may be software modules running in the processor 1220, resident/stored in the computer readable medium/memory 1225, one or more hardware modules coupled to the processor 1220, or some combination thereof.

In some aspects, the processing system 1210 may be a component of the UE 120 and may include the memory 282 and/or at least one of the TX MIMO processor 266, the RX processor 258, and/or the controller/processor 280. In some aspects, the apparatus 1205 for wireless communication includes means for generating an indication of a UE capability for switching polarizations of one or more antennas of the UE; and/or means for transmitting the indication. The aforementioned means may be one or more of the aforementioned components of the apparatus 1100 and/or the processing system 1210 of the apparatus 1205 configured to perform the functions recited by the aforementioned means. As described elsewhere herein, the processing system 1210 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 12 is provided as an example. Other examples may differ from what is described in connection with FIG. 12.

Figure 13:
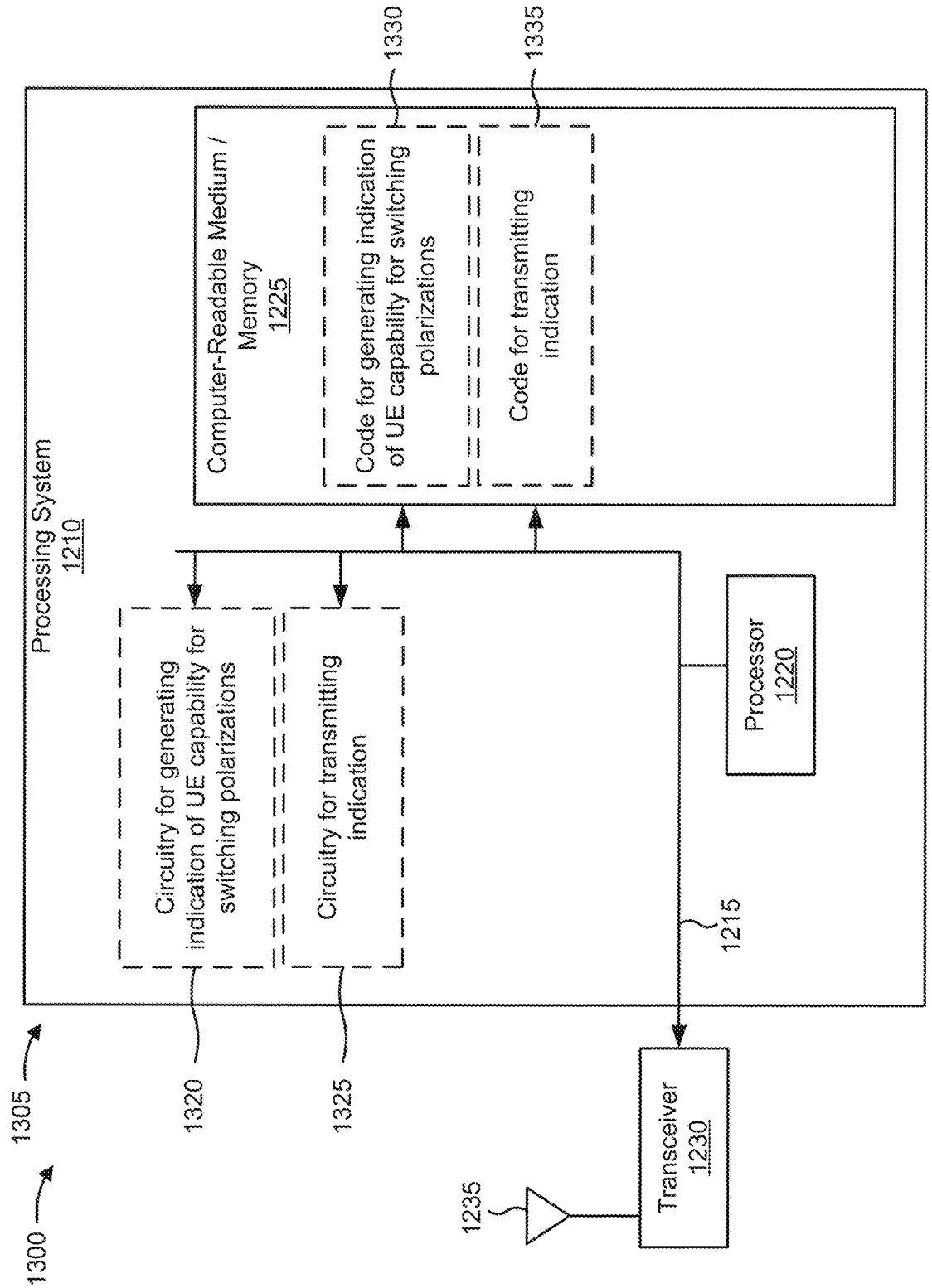
FIG. 13 is a diagram illustrating an example implementation of code and circuitry for an apparatus, in accordance with the present disclosure.

FIG. 13 is a diagram illustrating an example 1300 of an implementation of code and circuitry for an apparatus 1305. Apparatus 1305 may be a UE (e.g., UE 120).

As further shown in FIG. 13, the apparatus may include circuitry for generating an indication of a UE capability for switching polarizations of one or more antennas of the UE (circuitry 1320). For example, the apparatus may include circuitry to enable the apparatus to generate an indication of a UE capability for switching polarizations of one or more antennas of the UE.

As further shown in FIG. 13, the apparatus may include circuitry for transmitting the indication (circuitry 1325). For example, the apparatus may include circuitry to enable the apparatus to transmit the indication.

As further shown in FIG. 13, the apparatus may include, stored in computer-readable medium 1225, code for generating an indication of a UE capability for switching polarizations of one or more antennas of the UE (code 1330). For example, the apparatus may include code that, when executed by the processor 1220, may cause processor 1220 to generate an indication of a UE capability for switching polarizations of one or more antennas of the UE.

As further shown in FIG. 13, the apparatus may include, stored in computer-readable medium 1225, code for transmitting the indication (code 1335). For example, the apparatus may include code that, when executed by processor 1220, may cause processor 1220 to cause transceiver 1230 to transmit the indication.

FIG. 13 is provided as an example. Other examples may differ from what is described in connection with FIG. 13.

Figure 14:
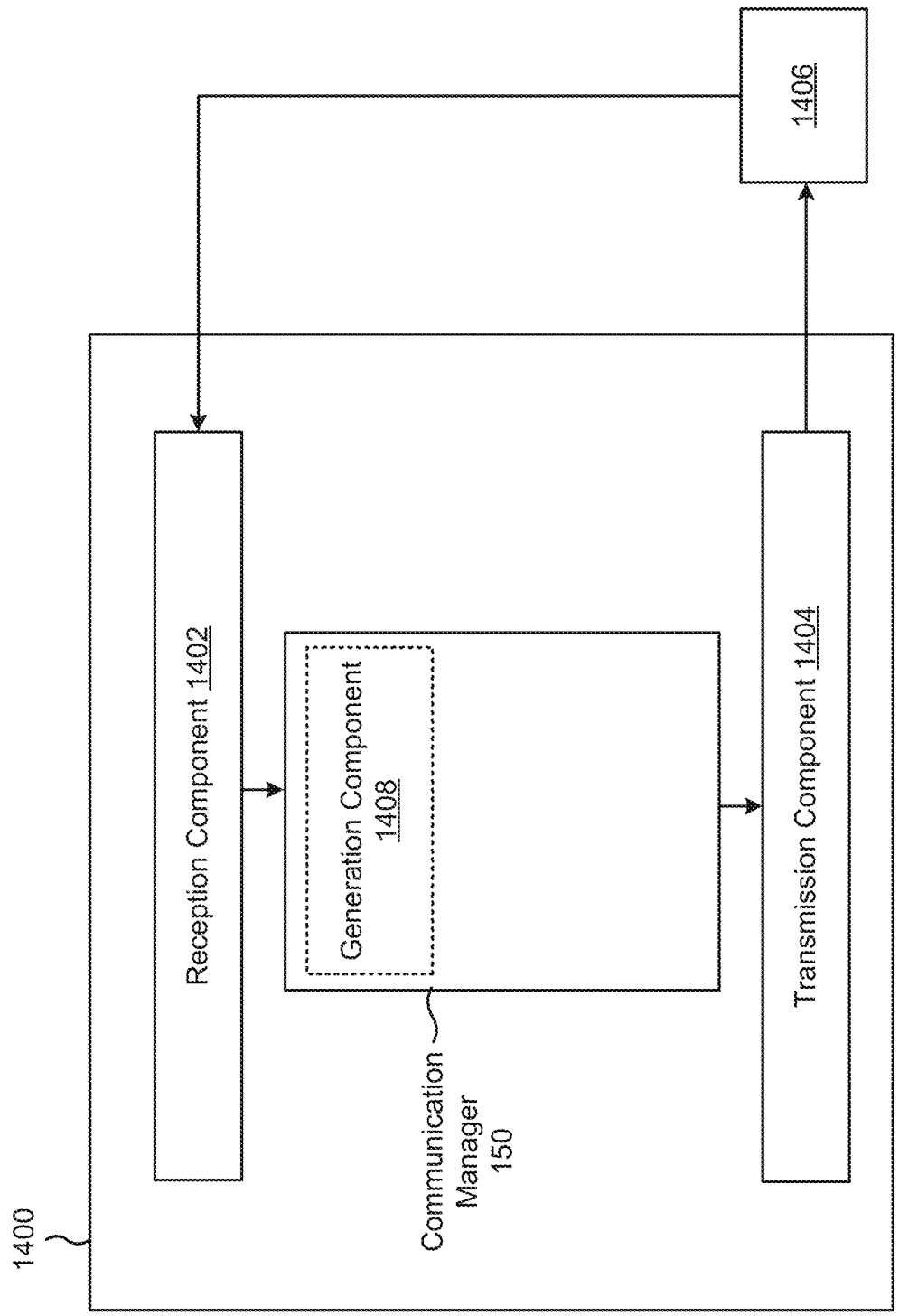
FIG. 14 is a diagram of an example apparatus for wireless communication, in accordance with the present disclosure.

FIG. 14 is a diagram of an example apparatus 1400 for wireless communication. The apparatus 1400 may be a base station (e.g., base station 110), or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include a generation component 1408, among other examples.

In some aspects, the apparatus 1400 may be configured to perform one or more operations described herein in connection with FIGS. 1-7. Additionally, or alternatively, the apparatus 1400 may be configured to perform one or more processes described herein, such as process 900 of FIG. 9. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The reception component 1402 may receive, from a UE, an indication of a UE capability for switching polarizations of one or more antennas of the UE. The generation component 1408 may generate scheduling information that is based at least in part on the UE capability. The transmission component 1404 may transmit, in DCI to the UE, the scheduling information.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
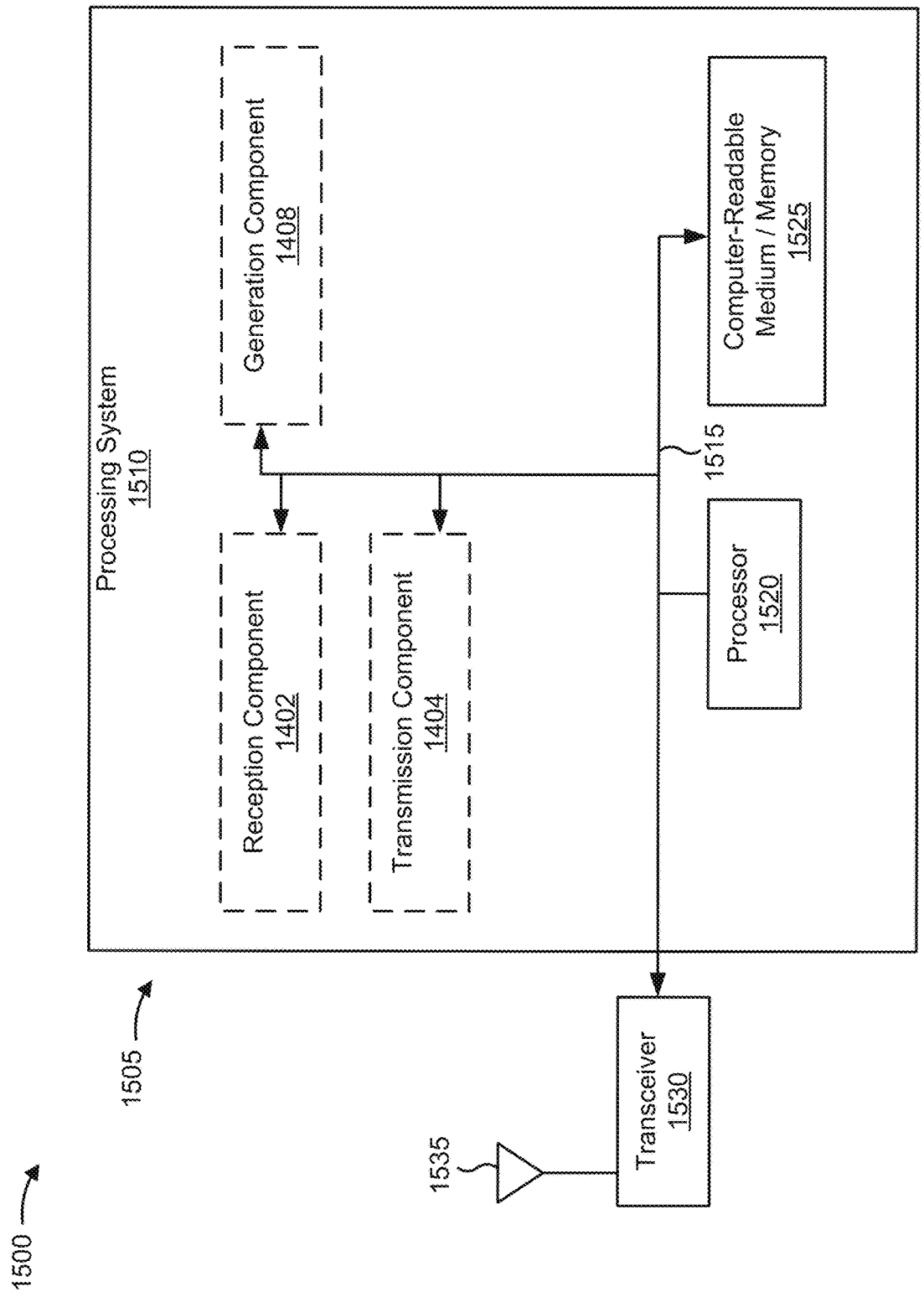
FIG. 15 is a diagram illustrating an example of a hardware implementation for an apparatus employing a processing system, in accordance with the present disclosure.

FIG. 15 is a diagram illustrating an example 1500 of a hardware implementation for an apparatus 1505 employing a processing system 1510. The apparatus 1505 may be a base station (e.g., base station 110, satellite 320).

The processing system 1510 may be implemented with a bus architecture, represented generally by the bus 1515. The bus 1515 may include any number of interconnecting buses and bridges depending on the specific application of the processing system 1510 and the overall design constraints. The bus 1515 links together various circuits including one or more processors and/or hardware components, represented by the processor 1520, the illustrated components, and the computer-readable medium/memory 1525. The bus 1515 may also link various other circuits, such as timing sources, peripherals, voltage regulators, and/or power management circuits.

The processing system 1510 may be coupled to a transceiver 1530. The transceiver 1530 is coupled to one or more antennas 1535. The transceiver 1530 provides a means for communicating with various other apparatuses over a transmission medium. The transceiver 1530 receives a signal from the one or more antennas 1535, extracts information from the received signal, and provides the extracted information to the processing system 1510, specifically the reception component 1402. In addition, the transceiver 1530 receives information from the processing system 1510, specifically the transmission component 1404, and generates a signal to be applied to the one or more antennas 1535 based at least in part on the received information.

The processing system 1510 includes a processor 1520 coupled to a computer-readable medium/memory 1525. The processor 1520 is responsible for general processing, including the execution of software stored on the computer-readable medium/memory 1525. The software, when executed by the processor 1520, causes the processing system 1510 to perform the various functions described herein for any particular apparatus. The computer-readable medium/memory 1525 may also be used for storing data that is manipulated by the processor 1520 when executing software. The processing system further includes at least one of the illustrated components. The components may be software modules running in the processor 1520, resident/stored in the computer readable medium/memory 1525, one or more hardware modules coupled to the processor 1520, or some combination thereof.

In some aspects, the processing system 1510 may be a component of the base station 110 and may include the memory 242 and/or at least one of the TX MIMO processor 230, the RX processor 238, and/or the controller/processor 240. In some aspects, the apparatus 1505 for wireless communication includes means for receiving, from a UE, an indication of a UE capability for switching polarizations of one or more antennas of the UE; and/or means for transmitting, in DCI to the UE, scheduling information that is based at least in part on the UE capability. The aforementioned means may be one or more of the aforementioned components of the apparatus 1400 and/or the processing system 1510 of the apparatus 1505 configured to perform the functions recited by the aforementioned means. As described elsewhere herein, the processing system 1510 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 15 is provided as an example. Other examples may differ from what is described in connection with FIG. 15.

Figure 16:
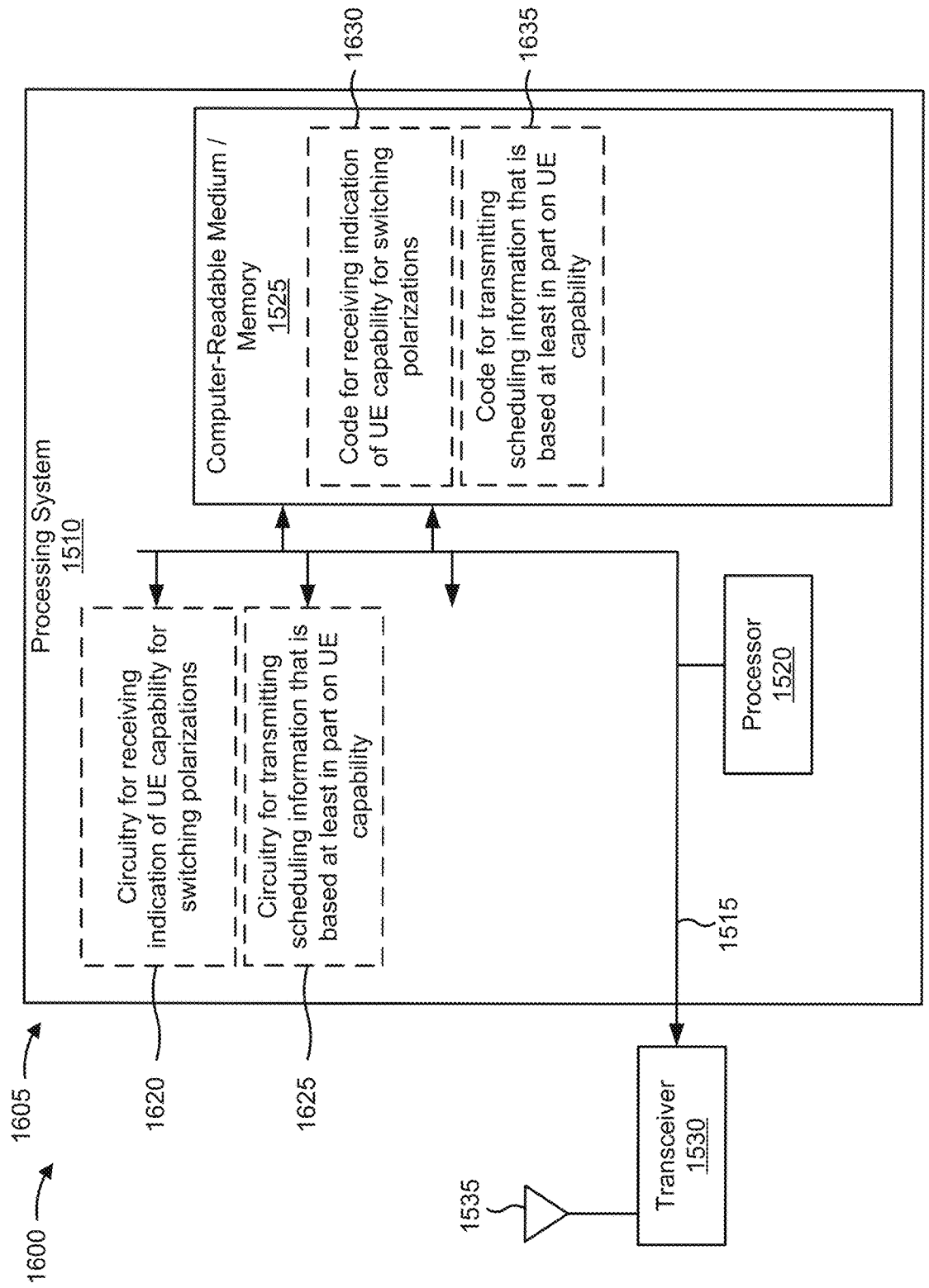
FIG. 16 is a diagram illustrating an example implementation of code and circuitry for an apparatus, in accordance with the present disclosure.

FIG. 16 is a diagram illustrating an example 1600 of an implementation of code and circuitry for an apparatus 1605. Apparatus 1605 may be a UE (e.g., UE 120).

As further shown in FIG. 16, the apparatus may include circuitry for receiving, from a UE, an indication of a UE capability for switching polarizations of one or more antennas of the UE (circuitry 1620). For example, the apparatus may include circuitry to enable the apparatus to receive, from a UE, an indication of a UE capability for switching polarizations of one or more antennas of the UE.

As further shown in FIG. 16, the apparatus may include circuitry for transmitting, in DCI to the UE, scheduling information that is based at least in part on the UE capability (circuitry 1625). For example, the apparatus may include circuitry to enable the apparatus to transmit, in DCI to the UE, scheduling information that is based at least in part on the UE capability.

As further shown in FIG. 16, the apparatus may include, stored in computer-readable medium 1525, code for receiving, from a UE, an indication of a UE capability for switching polarizations of one or more antennas of the UE (code 1630). For example, the apparatus may include code that, when executed by the processor 1520, may cause processor 1520 to cause transceiver 1530 to receive, from a UE, an indication of a UE capability for switching polarizations of one or more antennas of the UE.

As further shown in FIG. 16, the apparatus may include, stored in computer-readable medium 1525, code for transmitting, in DCI to the UE, scheduling information that is based at least in part on the UE capability (code 1635). For example, the apparatus may include code that, when executed by processor 1520, may cause processor 1520 to cause transceiver 1530 to transmit, in DCI to the UE, scheduling information that is based at least in part on the UE capability.

FIG. 16 is provided as an example. Other examples may differ from what is described in connection with FIG. 16.

Figure 17:
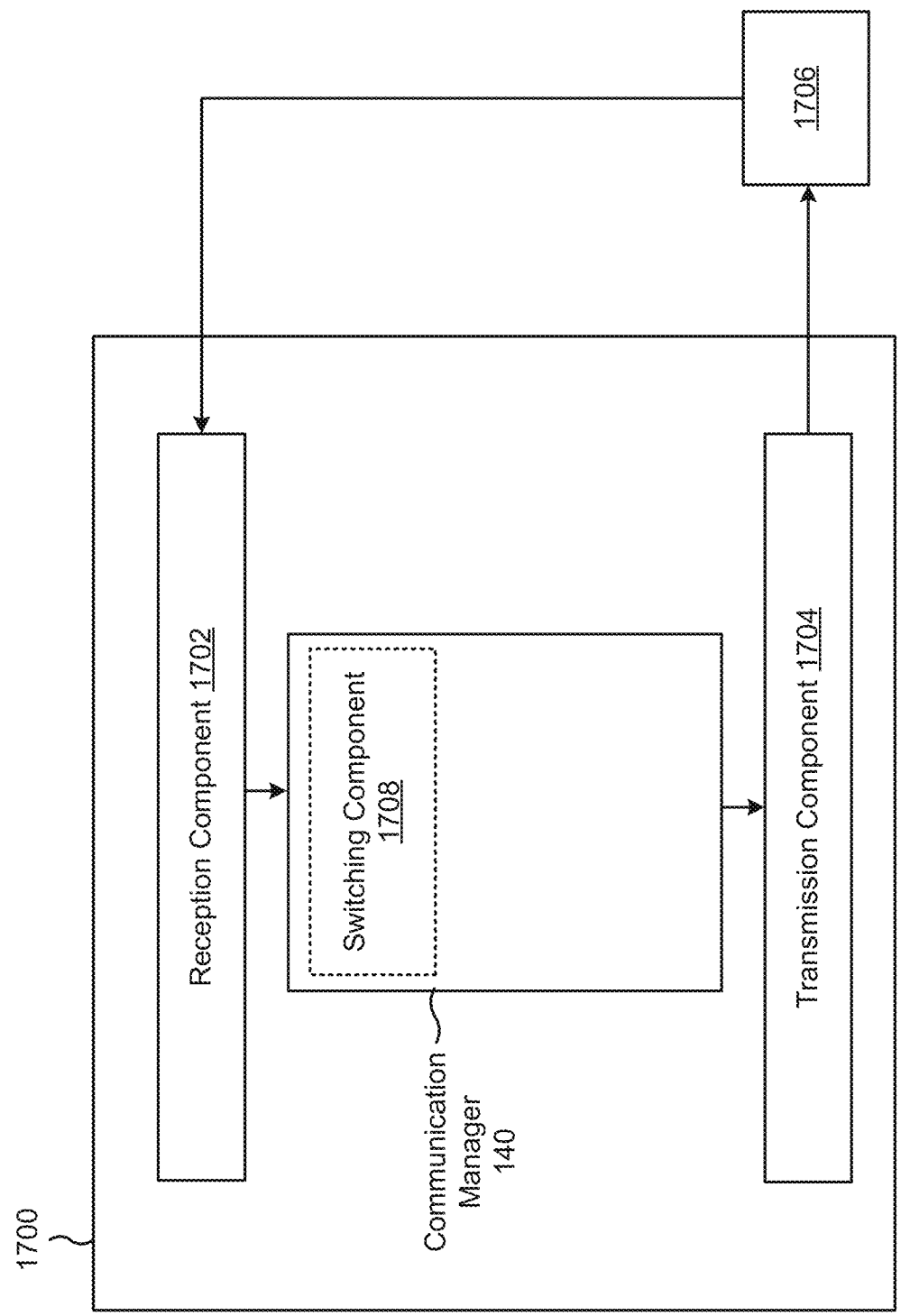
FIG. 17 is a diagram of an example apparatus for wireless communication, in accordance with the present disclosure.

FIG. 17 is a diagram of an example apparatus 1700 for wireless communication. The apparatus 1700 may be a UE (e.g., UE 120), or a UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 140. The communication manager 140 may include a switching component 1708, among other examples.

In some aspects, the apparatus 1700 may be configured to perform one or more operations described herein in connection with FIGS. 1-7. Additionally, or alternatively, the apparatus 1700 may be configured to perform one or more processes described herein, such as process 1000 of FIG. 10. In some aspects, the apparatus 1700 and/or one or more components shown in FIG. 17 may include one or more components of the UE described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the UE described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the UE described in connection with FIG. 2. In some aspects, the transmission component 1704 may be co-located with the reception component 1702 in a transceiver.

The switching component 1708 may switch polarizations of one or more antennas of the UE based at least in part on a UE capability of the UE for switching polarizations. The transmission component 1704 may transmit or receive a communication.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
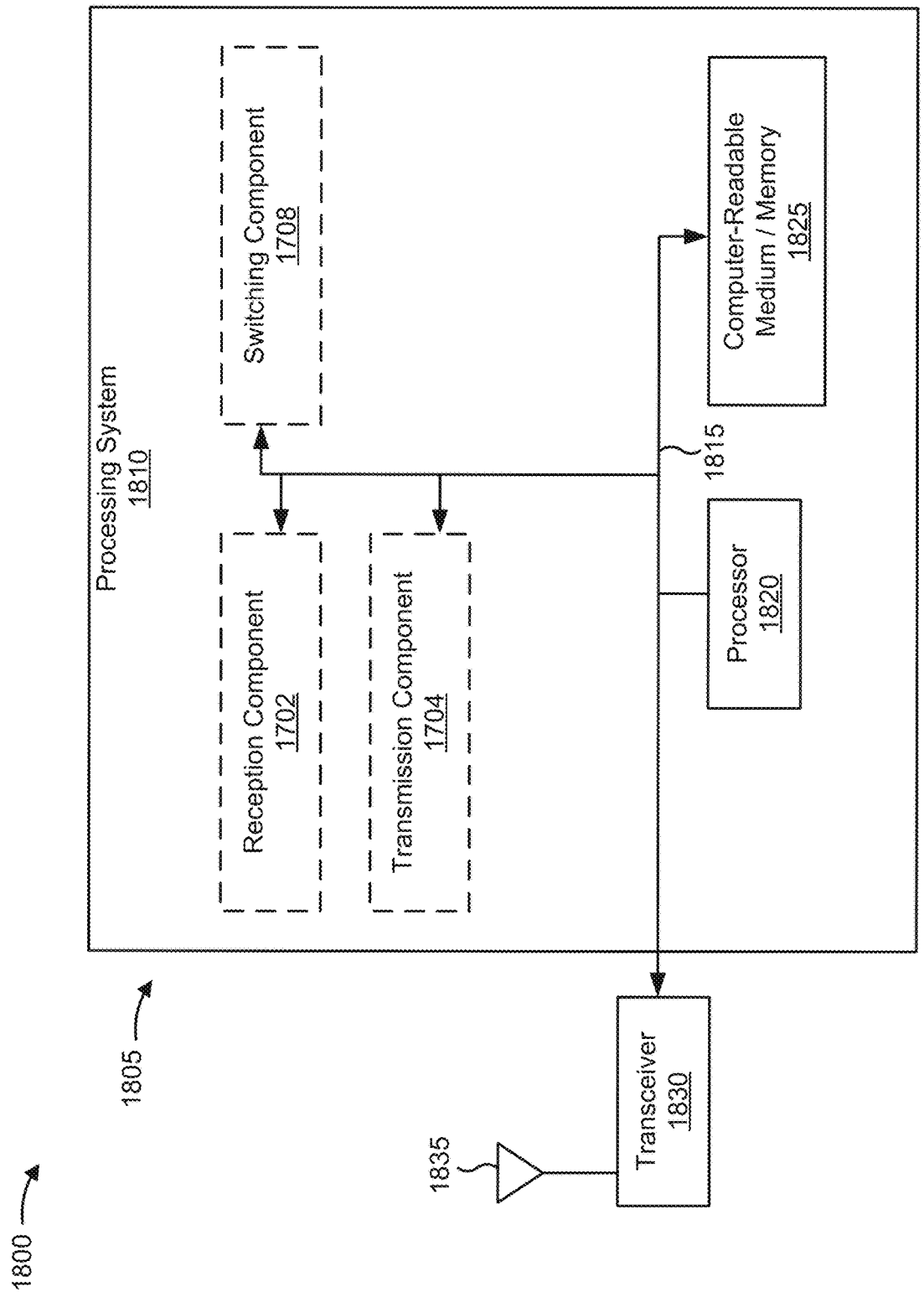
FIG. 18 is a diagram illustrating an example of a hardware implementation for an apparatus employing a processing system, in accordance with the present disclosure.

FIG. 18 is a diagram illustrating an example 1800 of a hardware implementation for an apparatus 1805 employing a processing system 1810. The apparatus 1805 may be a UE.

The processing system 1810 may be implemented with a bus architecture, represented generally by the bus 1815. The bus 1815 may include any number of interconnecting buses and bridges depending on the specific application of the processing system 1810 and the overall design constraints. The bus 1815 links together various circuits including one or more processors and/or hardware components, represented by the processor 1820, the illustrated components, and the computer-readable medium/memory 1825. The bus 1815 may also link various other circuits, such as timing sources, peripherals, voltage regulators, and/or power management circuits.

The processing system 1810 may be coupled to a transceiver 1830. The transceiver 1830 is coupled to one or more antennas 1835. The transceiver 1830 provides a means for communicating with various other apparatuses over a transmission medium. The transceiver 1830 receives a signal from the one or more antennas 1835, extracts information from the received signal, and provides the extracted information to the processing system 1810, specifically the reception component 1702. In addition, the transceiver 1830 receives information from the processing system 1810, specifically the transmission component 1704, and generates a signal to be applied to the one or more antennas 1835 based at least in part on the received information.

The processing system 1810 includes a processor 1820 coupled to a computer-readable medium/memory 1825. The processor 1820 is responsible for general processing, including the execution of software stored on the computer-readable medium/memory 1825. The software, when executed by the processor 1820, causes the processing system 1810 to perform the various functions described herein for any particular apparatus. The computer-readable medium/memory 1825 may also be used for storing data that is manipulated by the processor 1820 when executing software. The processing system further includes at least one of the illustrated components. The components may be software modules running in the processor 1820, resident/stored in the computer readable medium/memory 1825, one or more hardware modules coupled to the processor 1820, or some combination thereof.

In some aspects, the processing system 1810 may be a component of the UE 120 and may include the memory 282 and/or at least one of the TX MIMO processor 266, the RX processor 258, and/or the controller/processor 280. In some aspects, the apparatus 1805 for wireless communication includes means for switching polarizations of one or more antennas of the UE based at least in part on a UE capability of the UE for switching polarizations; and/or means for transmitting or receiving a communication. The aforementioned means may be one or more of the aforementioned components of the apparatus 1700 and/or the processing system 1810 of the apparatus 1805 configured to perform the functions recited by the aforementioned means. As described elsewhere herein, the processing system 1810 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 18 is provided as an example. Other examples may differ from what is described in connection with FIG. 18.

Figure 19:
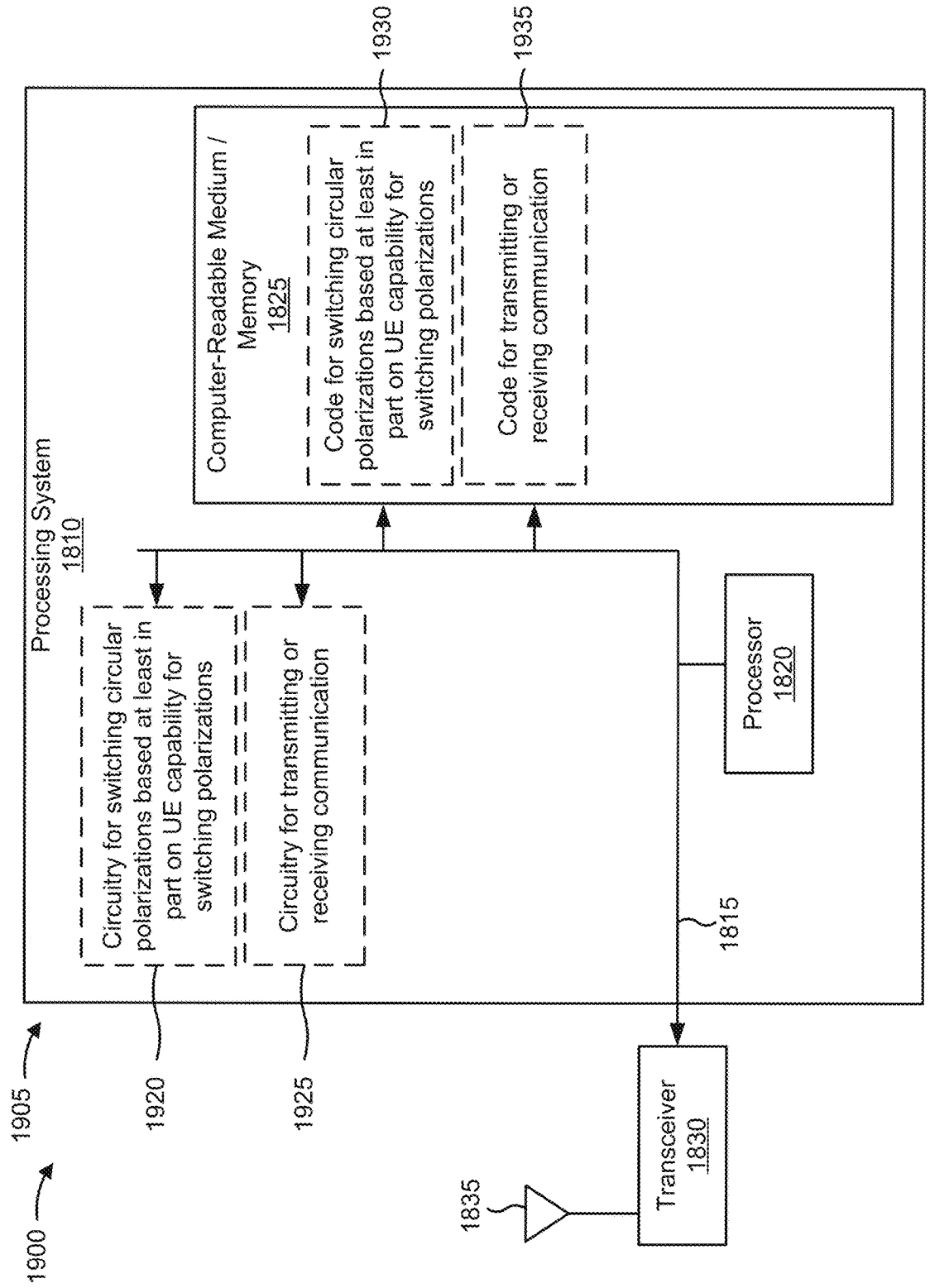
FIG. 19 is a diagram illustrating an example implementation of code and circuitry for an apparatus, in accordance with the present disclosure.

FIG. 19 is a diagram illustrating an example 1900 of an implementation of code and circuitry for an apparatus 1905. Apparatus 1905 may be a UE (e.g., UE 120).

As further shown in FIG. 19, the apparatus may include circuitry for switching polarizations of one or more antennas of the UE based at least in part on a UE capability of the UE for switching polarizations (circuitry 1920). For example, the apparatus may include circuitry to enable the apparatus to switch polarizations of one or more antennas of the UE based at least in part on a UE capability of the UE for switching polarizations.

As further shown in FIG. 19, the apparatus may include circuitry for transmitting or receiving a communication (circuitry 1925). For example, the apparatus may include circuitry to enable the apparatus to transmit or receive a communication.

As further shown in FIG. 19, the apparatus may include, stored in computer-readable medium 1825, code for switching polarizations of one or more antennas of the UE based at least in part on a UE capability of the UE for switching polarizations (code 1930). For example, the apparatus may include code that, when executed by the processor 1520, may cause processor 1820 to switch polarizations of one or more antennas of the UE based at least in part on a UE capability of the UE for switching polarizations.

As further shown in FIG. 19, the apparatus may include, stored in computer-readable medium 1825, code for transmitting or receiving a communication (code 1935). For example, the apparatus may include code that, when executed by processor 1520, may cause processor 1520 to cause transceiver 1530 to transmit or receive a communication.

FIG. 19 is provided as an example. Other examples may differ from what is described in connection with FIG. 19.

Figure 20:
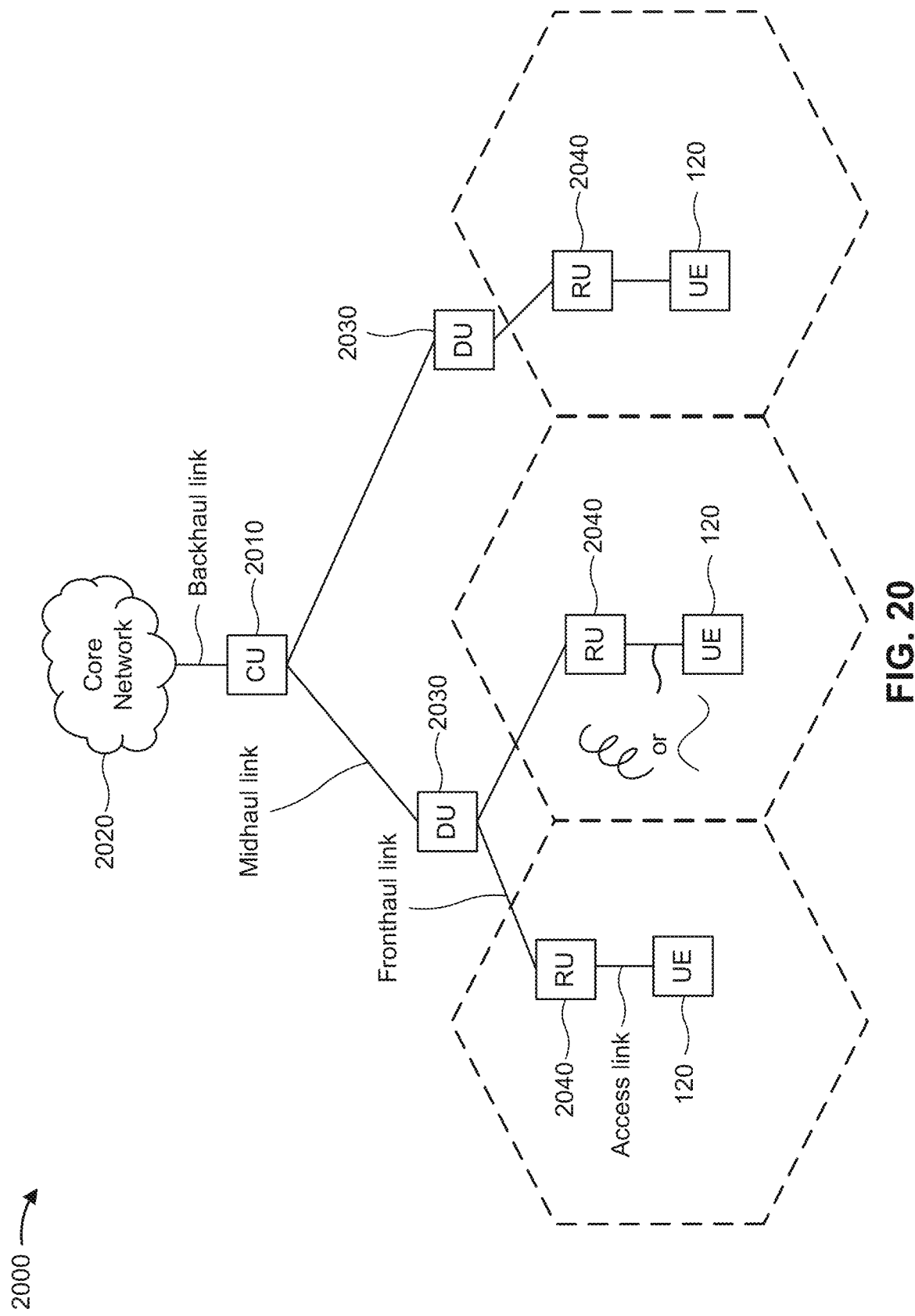
FIG. 20 is a diagram illustrating an example of an open radio access network (O-RAN) architecture, in accordance with the present disclosure.

FIG. 20 is a diagram illustrating an example 2000 of an open radio access network (O-RAN) architecture, in accordance with the present disclosure. As shown in FIG. 20, the O-RAN architecture may include a central unit (CU) 2010 that communicates with a core network 2020 via a backhaul link. Furthermore, the CU 2010 may communicate with one or more distributed units (DUs) 2030 via respective midhaul links. The DUs 2030 may each communicate with one or more radio units (RUs) 2040 via respective fronthaul links, and the RUs 2040 may each communicate with respective UEs 120 via radio frequency (RF) access links. The DUs 2030 and the RUs 2040 may also be referred to as O-RAN DUs (O-DUs) 2030 and O-RAN RUs (O-RUs) 2040, respectively.

In some aspects, the DUs 2030 and the RUs 2040 may be implemented according to a functional split architecture in which functionality of a base station 110 (e.g., an eNB or a gNB) is provided by a DU 2030 and one or more RUs 2040 that communicate over a fronthaul link. Accordingly, as described herein, a base station 110 may include a DU 2030 and one or more RUs 2040 that may be co-located or geographically distributed. In some aspects, the DU 2030 and the associated RU(s) 2040 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 2030 may correspond to a logical unit that includes one or more base station functions to control the operation of one or more RUs 2040. For example, in some aspects, the DU 2030 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), RRC, and/or service data adaptation protocol (SDAP), may be hosted by the CU 2010. The RU(s) 2040 controlled by a DU 2030 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 2040 handle all over the air (OTA) communication with a UE 120, and real-time and non-real-time aspects of control and user plane communication with the RU(s) 2040 are controlled by the corresponding DU 2030, which enables the DU(s) 2030 and the CU 2010 to be implemented in a cloud-based RAN architecture.

In some aspects, a UE 120 may transmit an indication of a UE capability for switching polarizations to an RU 2040, which may provide the indication to a DU 2030. The DU 2030 may control other RUs 2040 and/or provide the indication to the CU 2010. The CU 2010 may distribute the indication or associated information to DUs 2030 and RUs 2040. The RUs 2040 within the O-RAN architecture may coordinate with UEs 120 to switch polarizations according to respective UE capabilities of the UEs 120.

As indicated above, FIG. 20 is provided as an example. Other examples may differ from what is described with regard to FIG. 20.

The following provides an overview of some Aspects of the present disclosure:

Aspect 1: A method of wireless communication performed by a user equipment (UE), comprising: generating an indication of a UE capability for switching polarizations of one or more antennas of the UE; and transmitting the indication.

Aspect 2: The method of Aspect 1, wherein the UE capability includes a switching time duration for switching polarizations.

Aspect 3: The method of Aspect 2, wherein the switching time duration is a minimum quantity of symbols between receiving downlink control information (DCI) and applying a new polarization indicated by the DCI for processing a physical downlink shared channel communication.

Aspect 4: The method of Aspect 2, wherein the switching time duration is a minimum quantity of symbols between receiving downlink control information (DCI) and applying a new polarization indicated by the DCI for a triggered aperiodic channel state information reference signal.

Aspect 5: The method of any of Aspects 1-4, wherein generating the indication includes: selecting the UE capability from among one or more UE capability types for switching polarizations; and selecting a value that corresponds to the UE capability.

Aspect 6: The method of any of Aspects 1-5, wherein the UE capability is for a physical downlink shared channel communication received in association with a subcarrier spacing (SCS) of 15 kilohertz (kHz) or 30 kHz in frequency range 1 (FR1), or for an aperiodic channel state information reference signal received in association with an SCS of 15 kHz or 30 kHz in FR1.

Aspect 7: The method of any of Aspects 1-6, wherein the UE capability includes a UE capability to switch from a first polarization of the one or more antennas of the UE to a second polarization of the one or more antennas of the UE.

Aspect 8: The method of any of Aspects 1-6, wherein the UE capability for switching polarizations includes a UE capability for one of switching from a linear polarization to a circular polarization, switching from a first circular polarization to a second polarization, or switching from a circular polarization to a linear polarization.

Aspect 9: The method of any of Aspects 1-6, wherein the UE capability includes a UE capability for switching from a first linear polarization to a second linear polarization.

Aspect 10: A method of wireless communication performed by a base station, comprising: receiving, from a user equipment (UE), an indication of a UE capability for switching polarizations of one or more antennas of the UE; and transmitting, in downlink control information (DCI) to the UE, scheduling information that is based at least in part on the UE capability.

Aspect 11: The method of Aspect 10, wherein the DCI indicates a new polarization for the UE.

Aspect 12: The method of Aspect 11, wherein the UE capability indicates a switching time duration that is a minimum quantity of symbols between the UE receiving the DCI and the UE applying the new polarization for processing a physical downlink shared channel communication.

Aspect 13: The method of Aspect 11, wherein the UE capability indicates a switching time duration that is a minimum quantity of symbols between the UE receiving the DCI and the UE applying the new polarization for a triggered aperiodic channel state information reference signal.

Aspect 14: A method of wireless communication performed by a user equipment (UE), comprising: switching polarizations of one or more antennas of the UE based at least in part on a UE capability of the UE for switching polarizations; and transmitting or receiving a communication.

Aspect 15: The method of Aspect 14, wherein a switching time duration associated with the UE capability for switching polarizations corresponds to a minimum supported beam switching time for quasi co-location (QCL) type D.

Aspect 16: The method of Aspect 14 or 15, wherein the UE capability is of a UE capability type that is dedicated to indicating a switching time duration in which the UE is to switch polarizations.

Aspect 17: The method of any of Aspects 14-16, wherein switching polarizations includes switching to a default polarization if an indication of a polarization is absent in downlink control information (DCI) or if an offset between the DCI and a physical downlink shared channel (PDSCH) communication or an aperiodic channel state information reference signal (CSI-RS) is smaller than a switching time duration associated with the UE capability for switching polarizations.

Aspect 18: The method of Aspect 17, wherein the default polarization corresponds to an activated polarization transmission configuration indicator state with a lowest identifier applicable to a PDSCH in an active bandwidth part of a serving cell.

Aspect 19: The method of Aspect 17, wherein the default polarization corresponds to a polarization of a downlink signal that is to be received in a same symbol as an aperiodic channel state information reference signal (CSI-RS).

Aspect 20: The method of Aspect 19, wherein the downlink signal is another PDSCH communication with an offset that is greater than or equal to a switching time duration associated with the UE capability for switching polarizations.

Aspect 21: The method of Aspect 20, wherein the other PDSCH communication has a first polarization transmission configuration indicator (TCI) state and a second polarization TCI state, and wherein switching polarizations includes switching to a polarization of the first polarization TCI state.

Aspect 22: The method of Aspect 19, wherein the downlink signal is another aperiodic CSI-RS with a triggering offset that is greater than or equal to a switching time duration associated with the UE capability for switching polarizations.

Aspect 23: The method of Aspect 19, wherein the downlink signal is a periodic CSI-RS or a semi-persistent CSI-RS.

Aspect 24: The method of Aspect 17, wherein switching polarizations includes switching to a polarization that corresponds to a lowest control resource set (CORESET) identifier in a most recent slot in which one or more CORESETs within an active bandwidth part of a serving cell are monitored, if a CORESET is configured in an aperiodic CSI-RS carrier.

Aspect 25: The method of Aspect 17, wherein switching polarizations includes switching to a polarization that corresponds to an activated polarization transmission configuration indicator state with a lowest identifier applicable to a PDSCH in an active bandwidth part of a serving cell with an aperiodic channel state information reference signal (CSI-RS) carrier, if a control resource set (CORESET) is not configured in an aperiodic CSI-RS carrier.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, the one or more processors configured to cause the apparatus to:
      generate an indication of a UE capability to switch polarizations of one or more antennas of the UE, the UE capability including a switching time duration for switching polarizations, wherein the switching time duration is a minimum quantity of symbols between reception of downlink control information (DCI) and application of a new polarization indicated by the DCI for another signal; and
      transmit the indication.

2. The apparatus of claim 1, wherein the another signal is a physical downlink shared channel communication.

3. The apparatus of claim 1, wherein the another signal is a triggered aperiodic channel state information reference signal.

4. The apparatus of claim 1, wherein the one or more processors, to generate the indication, are configured to cause the apparatus to:
   select the UE capability from among one or more UE capability types for switching polarizations; and
   select a value that corresponds to the UE capability.

5. The apparatus of claim 1, wherein the UE capability is for a physical downlink shared channel communication received in association with a subcarrier spacing (SCS) of 15 kilohertz (kHz) or 30 kHz in frequency range 1 (FR1), or for an aperiodic channel state information reference signal received in association with an SCS of 15 kHz or 30 kHz in FR1.

6. The apparatus of claim 1, wherein the UE capability includes a UE capability to switch from a first polarization of the one or more antennas of the UE to a second polarization of the one or more antennas of the UE.

7. The apparatus of claim 1, wherein the UE capability to switch polarizations of the one or more antennas of the UE includes:
   a UE capability to switch from a linear polarization to a circular polarization,
   a UE capability to switch from a first circular polarization to a second polarization, or
   a UE capability to switch from a circular polarization to a linear polarization.

8. The apparatus of claim 1, wherein the UE capability to switch polarizations of the one or more antennas of the UE includes a UE capability to switch from a first linear polarization to a second linear polarization.

9. The apparatus of claim 1, further comprising:
   one or more transmitters coupled to the one or more processors and configured to provide the indication to the one or more antennas of the UE for transmission.

10. An apparatus for wireless communication at a network entity, comprising:
    one or more memories; and
    one or more processors, coupled to the one or more memories, the one or more processors configured to cause the apparatus to:
       obtain an indication of a user equipment (UE) capability for switching polarizations of one or more antennas of the UE, the UE capability including a switching time duration for switching polarizations, wherein the switching time duration is a minimum quantity of symbols between reception of downlink control information (DCI) and application of a new polarization indicated by the DCI for another signal; and output, for transmission in the DCI, scheduling information that is based at least in part on the UE capability.

11. The apparatus of claim 10, wherein the another signal is a physical downlink shared channel communication.

12. The apparatus of claim 10, wherein the another signal is a triggered aperiodic channel state information reference signal.

13. The apparatus of claim 10, further comprising:
one or more transmitters coupled to the one or more processors.

14. An apparatus for wireless communication at a user equipment (UE), comprising:
one or more memories; and
one or more processors, coupled to the one or more memories, the one or more processors configured to cause the apparatus to:
switch polarizations of one or more antennas of the UE based at least in part on a UE capability to switch polarizations, the UE capability including a switching time duration for switching polarizations, wherein to switch polarizations, the one or more processors are configured to cause the apparatus to switch to a default polarization based at least in part on one or more of:
an indication of a polarization being absent in downlink control information (DCI), or
an offset between the DCI and another signal being smaller than the switching time duration associated with the UE capability to switch polarizations; and
transmit or receive a communication.

15. The apparatus of claim 14,
wherein the another signal is one of a physical downlink shared channel (PDSCH) communication or an aperiodic channel state information reference signal (CSI-RS).

16. The apparatus of claim 15, wherein the default polarization corresponds to an activated polarization transmission configuration indicator state with a lowest identifier applicable to a PDSCH in an active bandwidth part of a serving cell.

17. The apparatus of claim 15, wherein the default polarization corresponds to a polarization of a downlink signal that is to be received in a same symbol as an aperiodic CSI-RS.

18. The apparatus of claim 17, wherein the downlink signal is another PDSCH communication with an offset that is greater than or equal to the switching time duration associated with the UE capability for switching polarizations.

19. The apparatus of claim 18, wherein the other PDSCH communication has a first polarization transmission configuration indicator (TCI) state and a second polarization TCI state, and wherein to switch polarizations, the one or more processors are configured to cause the apparatus to switch to a polarization of the first polarization TCI state.

20. The apparatus of claim 17, wherein the downlink signal is another aperiodic CSI-RS with a triggering offset that is greater than or equal to the switching time duration associated with the UE capability to switch polarizations.

21. The apparatus of claim 17, wherein the downlink signal is a periodic CSI-RS or a semi-persistent CSI-RS.

22. The apparatus of claim 15, wherein to switch polarizations, the one or more processors are configured to cause the apparatus to switch to a polarization that corresponds to a lowest control resource set (CORESET) identifier in a most recent slot in which one or more CORESETs within an active bandwidth part of a serving cell are monitored, if a CORESET is configured in an aperiodic CSI-RS carrier.

23. The apparatus of claim 15, wherein to switch polarizations, the one or more processors are configured to cause the apparatus to switch to a polarization that corresponds to an activated polarization transmission configuration indicator state with a lowest identifier applicable to a PDSCH in an active bandwidth part of a serving cell with an aperiodic CSI-RS carrier, if a control resource set (CORESET) is not configured in an aperiodic CSI-RS carrier.

24. The apparatus of claim 14, further comprising:
one or more transmitters coupled to the one or more processors.

25. An apparatus for wireless communication at a user equipment (UE), comprising:
one or more memories; and
one or more processors, coupled to the one or more memories, the one or more processors configured to cause the apparatus to:
switch polarizations of one or more antennas of the UE based at least in part on a UE capability to switch polarizations, the UE capability including a switching time duration for switching polarizations that corresponds to a minimum supported beam switching time for quasi co-location (QCL) type D; and
transmit or receive a communication.

26. An apparatus for wireless communication at a user equipment (UE), comprising:
one or more memories; and
one or more processors coupled to the one or more memories, the one or more processors configured to cause the apparatus to:
switch polarizations of one or more antennas of the UE based at least in part on a UE capability to switch polarizations, wherein the UE capability includes a switching time duration for switching polarizations and is of a UE capability type that is dedicated to indicate the switching time duration for switching polarizations; and
transmit or receive a communication.

27. A method of wireless communication performed at a user equipment (UE), comprising:
generating an indication of a UE capability to switch polarizations of one or more antennas of the UE, the UE capability including a switching time duration for switching polarizations, the switching time duration being a minimum quantity of symbols between receiving downlink control information (DCI) and applying a new polarization indicated by the DCI for another signal; and
transmitting the indication.

28. The method of claim 27, wherein the another signal is a physical downlink shared channel communication.

29. The method of claim 27, wherein the another signal is a triggered aperiodic channel state information reference signal.

30. The method of claim 27, wherein generating the indication includes:
selecting the UE capability from among one or more UE capability types for switching polarizations; and
selecting a value that corresponds to the UE capability.

31. The method of claim 27, wherein the UE capability includes a UE capability to switch from a first polarization of the one or more antennas of the UE to a second polarization of the one or more antennas of the UE.

32. A method of wireless communication performed at a network entity, comprising:
obtaining an indication of a user equipment (UE) capability for switching polarizations of one or more antennas of the UE, the UE capability including a switching time duration for switching polarizations, wherein the switching time duration is a minimum quantity of symbols between reception of downlink control information (DCI) and application of a new polarization indicated by the DCI for another signal; and
outputting, for transmission in the DCI, scheduling information that is based at least in part on the UE capability.

33. The method of claim 32, wherein the another signal is a physical downlink shared channel communication.

34. The method of claim 32, wherein the another signal is a triggered aperiodic channel state information reference signal.

35. A method of wireless communication performed at a user equipment (UE), comprising:
switching polarizations of one or more antennas of the UE based at least in part on a UE capability to switch polarizations, the UE capability including a switching time duration for switching polarizations corresponding to a minimum supported beam switching time for quasi co-location (QCL) type D; and
transmitting or receiving a communication.

36. The method of claim 35, wherein the UE capability is of a UE capability type that is dedicated to indicating the switching time duration for switching polarizations.

37. The method of claim 35, wherein switching polarizations further comprises:
switching to a default polarization based at least in part on one or more of:
an indication of a polarization being absent in downlink control information (DCI), or
an offset between the DCI and another signal being smaller than the switching time duration associated with the UE capability to switch polarizations, wherein the other another signal is one of a physical downlink shared channel (PDSCH) communication or an aperiodic channel state information reference signal (CSI-RS).

38. A non-transitory computer-readable medium storing a set of instructions for wireless communication, the set of instructions comprising:
one or more instructions that, when executed by one or more processors of a user equipment (UE), cause the UE to:
generate an indication of a UE capability to switch polarizations of one or more antennas of the UE, the UE capability including a switching time duration for switching polarizations, wherein the switching time duration is a minimum quantity of symbols between reception of downlink control information (DCI) and application of a new polarization indicated by the DCI for another signal; and
transmit the indication.

39. The non-transitory computer-readable medium of claim 38, wherein the another signal is a physical downlink shared channel communication.

40. The non-transitory computer-readable medium of claim 38, wherein the another signal is a triggered aperiodic channel state information reference signal.

41. The non-transitory computer-readable medium of claim 38, wherein the UE capability includes a UE capability to switch from a first polarization of the one or more antennas of the UE to a second polarization of the one or more antennas of the UE.

42. A non-transitory computer-readable medium storing a set of instructions for wireless communication, the set of instructions comprising:
one or more instructions that, when executed by one or more processors of a network entity, cause the network entity to:
obtain an indication of a user equipment (UE) capability for switching polarizations of one or more antennas of the UE, the UE capability including a switching time duration for switching polarizations, wherein the switching time duration is a minimum quantity of symbols between reception of downlink control information (DCI) and application of a new polarization indicated by the DCI for another signal; and
output, for transmission in the DCI, scheduling information that is based at least in part on the UE capability.

43. The non-transitory computer-readable medium of claim 42, wherein the another signal is one of physical downlink shared channel communication or a triggered aperiodic channel state information reference signal.

44. A non-transitory computer-readable medium storing a set of instructions for wireless communication, the set of instructions comprising:
one or more instructions that, when executed by one or more processors of a user equipment (UE), cause the UE to:
switch polarizations of one or more antennas of the UE based at least in part on a UE capability to switch polarizations, the UE capability including a switching time duration for switching polarizations and being of a UE capability type that is dedicated to indicating the switching time duration for switching polarizations; and
transmit or receive a communication.

45. The non-transitory computer-readable medium of claim 44, wherein the switching time duration associated with the UE capability to switch polarizations corresponds to a minimum supported beam switching time for quasi co-location (QCL) type D.

* * * * *